(12) United States Patent
Viswanathan et al.

(10) Patent No.: US 11,775,604 B2
(45) Date of Patent: Oct. 3, 2023

(54) METHOD OF LOCATING POINTS OF INTEREST IN A GEOGRAPHIC AREA

(71) Applicant: Naver Corporation, Gyeonggi-do (KR)

(72) Inventors: Sruthi Viswanathan, Grenoble (FR); Jean-Michel Renders, Quaix-en-Chartreuse (FR); Bernard Omidvar-Tehrani, Saint Martin d'Hères (FR)

(73) Assignee: Naver Corporation

( * ) Notice: Subject to any disclaimer, the term of this patent is extended or adjusted under 35 U.S.C. 154(b) by 0 days.

(21) Appl. No.: 17/154,733

(22) Filed: Jan. 21, 2021

(65) Prior Publication Data
US 2021/0334326 A1 Oct. 28, 2021

(30) Foreign Application Priority Data

Apr. 24, 2020 (EP) .................................. 20305404

(51) Int. Cl.
*G06F 16/9537* (2019.01)
*H04W 4/029* (2018.01)
(Continued)

(52) U.S. Cl.
CPC .... *G06F 16/9537* (2019.01); *G06F 16/24578* (2019.01); *G06F 16/29* (2019.01);
(Continued)

(58) Field of Classification Search
CPC ............. G06F 16/9537; G06F 16/9535; G06F 16/24578; G06F 16/29; G06F 16/9536; G06F 16/9538; H04W 4/029
See application file for complete search history.

(56) References Cited

U.S. PATENT DOCUMENTS 7,747,478 B2 6/2010 Agrawal et al.
8,983,973 B2 3/2015 Hill et al.
(Continued)

FOREIGN PATENT DOCUMENTS

CN 104731846 A 6/2015
CN 107133262 A 9/2017
(Continued)

OTHER PUBLICATIONS

Shi, Chuan; Hu, Binbin; Zhao, Wayne Xin; and Yu, Philip S. "Heterogeneous information network embedding for recommendation". In arXiv:1711.10730v1 [cs.SI] Nov. 29, 2017.
(Continued)

*Primary Examiner* — Alford W Kindred
*Assistant Examiner* — Lin Lin M Htay

(57) ABSTRACT

A computer-implemented method of locating points of interest for a user in a geographic area is disclosed. A current state of the user is used as an index into a list of a plurality of current state functions to select at least one of the plurality of current state functions. Each current state function corresponds with a utility measure set where each utility measure set includes a plurality of utility measures ordered in a selected sequence. The computer is used to perform: (i) lexicographic optimization with respect to the plurality of current state functions so that the selected sequence of each utility measure set is optimally ordered, and (ii) rate a plurality of points of interest with respect to at least one of the plurality of optimized current state functions, and, based on the rating, to automatically select a set of points of interest for the user.

26 Claims, 6 Drawing Sheets

(51) Int. Cl.

| | |
|---|---|
| G06F 16/9535 | (2019.01) |
| G06F 16/2457 | (2019.01) |
| G06F 16/29 | (2019.01) |
| G06F 16/9536 | (2019.01) |
| G06F 16/9538 | (2019.01) |

(52) U.S. Cl.
CPC ...... *G06F 16/9535* (2019.01); *G06F 16/9536* (2019.01); *G06F 16/9538* (2019.01); *H04W 4/029* (2018.02)

(56) References Cited

U.S. PATENT DOCUMENTS

| | | | |
|---|---|---|---|
| 9,159,034 | B2 | 10/2015 | Pinckney et al. |
| 9,329,051 | B1 | 5/2016 | Ichinokawa et al. |
| 10,018,480 | B2 | 7/2018 | Montell |
| 10,289,648 | B2 | 5/2019 | Arora et al. |
| 2002/0055926 | A1* | 5/2002 | Dan .................. G01C 21/20 |
| 2011/0196751 | A1* | 8/2011 | Steelberg ............ G06Q 30/02 705/14.73 |
| 2013/0024203 | A1 | 1/2013 | Flores et al. |
| 2013/0097162 | A1 | 4/2013 | Corcoran et al. |
| 2014/0059055 | A1 | 2/2014 | Nag et al. |
| 2015/0220835 | A1* | 8/2015 | Wilson ............ G06Q 30/0269 706/46 |
| 2016/0048900 | A1* | 2/2016 | Shuman ........... G06Q 30/0204 705/7.33 |
| 2016/0146626 | A1 | 5/2016 | Ichinokawa et al. |

FOREIGN PATENT DOCUMENTS

| | | |
|---|---|---|
| CN | 109508428 A | 3/2019 |
| CN | 109948066 A | 12/2020 |
| EP | 2581703 A1 | 5/2017 |

OTHER PUBLICATIONS

Singh, Manish; Borromeo, Ria Mae; Hosami, Anas; Amer-Yahia, Sihem; and Elbassuoni, Shady. "Customizing travel packages with interactive composite items". In 2017 IEEE International Conference on Data Science and Advanced Analytics, DSAA2017, Tokyo, Japan, Oct. 19-21, 2017, pp. 137-145, 2017.

Stumpf, Simone; Rajaram, Vidya; Li, Lida; Burnett, Margaret; Dietterich, Thomas; Sullivan, Erin; Drummond, Russell; and Herlocker, Jonathan. "Toward harnessing user feedback for machine learning". In Proceedings of the 12th International Conference on Intelligent User Interfaces, IUI '07, pp. 82-91, New York, NY, USA. ACM. 2007.

Wang, Danding; Yang, Qian; Abdul, Ashraf; and Lim, Brian Y.. "Designing theory-driven user-centric explainable AI". In Proceedings of the 2019 CHI Conference on Human Factors in Computing Systems, CHI '19, pp. 601:1-601:15, New York, NY, USA. ACM. 2019.

Wang, Shanfeng; Gong, Maoguo; Li, Haoliang; and Yang, Junwei. "Multi-objective optimization for long tail recommendation". Knowledge-Based Systems, 104(C):145-155, Jul. 2016.

Web page Elastic search available on the Internet at: www.elastic.co/products/elasticsearch. 2021.

Web page entitled "Did you know over 35 million people visit these historical destinations every year?" available on the Internet at: www.addisonlee.com/addlib/know-35-million-people-visit-historical-destinations-every-year/, Jul. 2017.

Web page Map box available on the Internet at: www.mapbox.com. 2021.

Web page Naver Maps available on the Internet at: beta.map.naver.com; 2021.

Web page Naver Maps available on the Internet at: m.map.naver.com; 2021.

Web page React Native available on the Internet at: facebook.github.io/react-native/.

Willamowski, Jutta; Clinchant, Stephane; Legras, Christophe; Michel, Sofia; and Shreepriya, Shreepriya. "Running tour generation for unknown environments". In International Conference on Human-Computer Interaction, pp. 528-535. Springer, 2019.

Wood, Jed R. and Wood, Larry E. "Card sorting: Current practices and beyond". J. Usability Studies, 4(1):1-6, Nov. 2008.

Xiang, Liang; Yuan, Quan; Zhao, Shiwan; Chen, Li; Zhang, Xiatian; Yang, Qing; and Sun, Jimeng. "Temporal recommendation on graphs via long-and short-term preference fusion". In Proceedings of the 16th ACM SIGKDD international conference on Knowledge discovery and data mining, pp. 723-732. ACM, 2010.

Xu, Zheng; Liu, Yunhuai; Yen, Neil; Mei, Lin; Luo, Xiangfeng; Wei, Xiao; and Hu, Chuanping. "Crowdsourcing based description of urban emergency events using social media big data". IEEE Transactions on Cloud Computing, 2016.

Yang, Carl; Bai, Lanxiao; Zhang, Chao; Yuan, Quan; and Han, Jiawei. "Bridging collaborative filtering and semi-supervised learning: a neural approach for poi recommendation". In Proceedings of the 23rd ACM SIGKDD International Conference on Knowledge Discovery and Data Mining, pp. 1245-1254. ACM, 2017.

Yang, Dingqi; Zhang, Daqing; and Qu, Bingqing. "Participatory cultural mapping based on collective behavior data in location-based social networks". ACM Transactions on Intelligent Systems and Technology (TIST), 7(3):30, 2016.

Yang, Dingqi; Zhang, Daqing; Zheng, Vincent W; and Yu, Zhiyong. "Modeling user activity preference by leveraging user spatial temporal characteristics in lbsns". In IEEE Transactions on Systems, Man, and Cybernetics: Systems, 45(1):129-142, 2014.

Ye, Mao; Yin, Peifeng; and Lee, Wang-Chien. "Location recommendation for location-based social networks". In SIGSPATIAL, pp. 458-461. ACM, 2010.

Ye, Mao; Yin, Peifeng; Lee, Wang-Chien; and Lee, Dik-Lun. "Exploiting geographical influence for collaborative point-of-interest recommendation". In Proceedings of the 34th international ACM SIGIR conference on Research and development in Information Retrieval, pp. 325-334. ACM, 2011.

Yuan, Quan; Cong, Gao; Ma, Zongyang; Sun, Aixin; and Thalmann, Nadia Magnenat. "Time-aware point-of-interest recommendation". In Proceedings of the 36th international ACM SIGIR conference on Research and development in information retrieval, pp. 363-372. ACM, 2013.

Zhang, Jia-Dong; Chow, Chi-Yin; and Li, Yanhua. "iGeoRec: A personalized and efficient geographical location recommendation framework". IEEE Transactions on Services Computing, 8(5):701-714, 2014.

Zhou, Xiao; Hristova, Desislava; Noulas, Anastasios; and Mascolo, Cecilia. "Detecting socio-economic impact of cultural investment through geo-social network analysis". In Eleventh International AAAI Conference on Web and Social Media, 2017.

Huybrechts, Liesbeth. "Participation is Risky. Approaches to Joint Creative Processes", Publisher: Valiz/Antennae Series. Apr. 30, 2014.

"Amazon Mechanical Turk. Getting Started Guide". Available on the Internet at: docs.aws.amazon.com/AWSMechTurk/latest/AWSMechanicalTurkGettingStartedGuide/amt-gsg.pdf#SvcIntro. API. Version Jan. 17, 2017.

Web page: EUtouring.com "Figures and Facts about Notre Dame Cathedral". Available on the Internet at: www.eutouring.com/facts_notre_dame_cathedral.html. 2021.

Web page: "Infographic: 10 Interesting Facts About Niagara Falls". Available on the Internet at: www.niagarafallshotels.com/blog/10-interesting-facts-about-niagara-falls/. Mar. 9, 2018.

Web page: Survey Monkey "Sample size calculator". Available on the Internet at: www.surveymonkey.com/mp/sample-size-calculator/. 2021.

Amershi, Saleema; Cakmak, Maya; Knox, William Bradley; and Kulesza, Todd. "Power to the people: The role of humans in interactive machine learning". AI Magazine, 35(4):105-120, Dec. 2014.

Amer-Yahia, Sihem; Elbassuoni, Shady; Omidvar-Tehrani, Behrooz; Borromeo, Ria Mae; and Farokhnejad, Mehrdad. "GroupTravel: Customizing travel packages for groups". In Advances in Database

(56) References Cited

OTHER PUBLICATIONS

Technology—22nd International Conference on Extending Database Technology, EDBT 2019, Lisbon, Portugal, pp. 133-144, Mar. 26-29, 2019.

Amin, Alia; Townsend, Sian; Van Ossenbruggen, Jacco; and Hardman, Lynda. "Fancy a drink in canary wharf?: A user study on location-based mobile search". In Tom Gross, Jan Gulliksen, Paula Kotzé, Lars Oestreicher, Philippe Palanque, Raquel Oliveira Prates, and Marco Winckler, editors, Human-Computer Interaction—INTERACT 2009, pp. 736-749, Berlin, Heidelberg, 2009. Springer Berlin Heidelberg. 2009.

Anand, Sarabjot Singh; and Mobasher, Bamshad. chapter "Contextual Recommendation", in "From web to social web: Discovering and deploying user and content profiles", pp. 142-160. Springer-Verlag, Berlin, Heidelberg, 2007.

Bahir, Eitan and Peled, Ammatzia. "Identifying and tracking major events using geo-social networks". Social science computer review, 31(4):458-470, 2013.

Bao, Jie; Zheng, Yu; Wilkie, David; and Mokbel, Mohamed. "Recommendations in location-based social networks: a survey". GeoInformatica, 19(3):525-565, 2015.

Battle, Leilani; Chang, Remco; and Stonebraker, Michael. "Dynamic prefetching of data tiles for interactive visualization". In Proceedings of the 2016 International Conference on Management of Data, pp. 1363-1375. ACM, 2016.

Berjani, Betim and Strufe, Thorsten. "A recommendation system for spots in location-based online social networks". In Proceedings of the 4th workshop on social network systems, p. 4. ACM, 2011.

Braun, Virginia and Clarke, Victoria. "Using thematic analysis in psychology". In Qualitative Research in Psychology, 3(2):77-101, available on the Internet at eprints.uwe.ac.uk/11735. 2006.

Brown, Nela and Stockman, Tony. "Examining the use of thematic analysis as a tool for informing design of new family communication technologies". In Proceedings of the 27th International BCS Human Computer Interaction Conference, BCS-HCI '13, pp. 21:1-21:6, Swinton, UK. British Computer Society. 2013.

Carpineto, Claudio; Mizzaro; Stefano; Romano, Giovanni; and Snidero, Matteo. "Mobile Information retrieval with search results clustering: Prototypes and evaluations". Journal of the American Society for Information Science and Technology, 2009.

Cheng, Chen; Yang, Haiqin; King, Irwin; and Lyu, Michael R. "Fused matrix factorization with geographical and social influence in location-based social networks". In Twenty-Sixth AAAI Conference on Artificial Intelligence, 2012.

Cho, Eunjoon; Myers, Seth A; and Leskovec, Jure. "Friendship and mobility: user movement in location-based social networks". In Proceedings of the 17th ACM SIGKDD international conference on Knowledge discovery and data mining, pp. 1082-1090. ACM, 2011.

Choudhury, Munmun De; Feldman, Moran; Amer-Yahia, Sihem; Golbandi, Nadav; Lempel, Ronny; and Yu, Cong. "Constructing travel itineraries from tagged geo-temporal breadcrumbs". In Proceedings of the 19th International Conference on World Wide Web, WWW 2010, Raleigh, North Carolina, USA, Apr. 26-30, 2010, pp. 1083-1084, 2010.

Chung, Hangil; Freund, Daniel; and Shmoys, David B. "Bike angels: An analysis of citi bike's incentive program". In Proceedings of the 1st ACM SIGCAS Conference on Computing and Sustainable Societies, p. 5. ACM, 2018.

Cui, Laizhong; Ou, Peng; Fu, Xianghua; Wen, Zhenkun; and Lu, Nan. « A novel multi-objective evolutionary algorithm for recommendation systems. J. Parallel Distrib. Comput., 103(C):53-63, May 2017.

Eiband, Malin; Schneider, Hanna; Bilandzic, Mark; Fazekas-Con, Julian; Haug, Mareike; and Hussmann, Heinrich. "Bringing transparency design into practice". In 23rd International Conference on Intelligent User Interfaces, IUI '18, pp. 211-223, New York, NY, USA. ACM.2018.

Eiband, Malin; Völkel, Sarah Theres; Buschek, Daniel; Cook, Sophia; and Hussmann, Heinrich. "When people and algorithms meet: User-reported problems in intelligent everyday applications". In Proceedings of the 24th International Conference on Intelligent User Interfaces, IUI '19, pp. 96-106, New York, NY, USA, 2019. ACM.

Emmerich, Michael TM and Deutz, André H. "A tutorial on multiobjective optimization: fundamentals and evolutionary methods". Natural computing, 17(3):585-609, 2018.

European Search Report for European Application No. 20305404.4 dated Jul. 7, 2020.

Feng, Kaiyu; Cong, Gao; Bhowmick, Sourav S; Peng, Wen-Chih; and Miao, Chunyan. "Towards best region search for data exploration". In Proceedings of the 2016 International Conference on Management of Data, pp. 1055-1070. ACM, 2016.

Ference, Gregory; Ye, Mao; and Lee, Wang-Chien. "Location recommendation for out-of-town users in location-based social networks". In Proceedings of the 22nd ACM international conference on Information & Knowledge Management, pp. 721-726. ACM, 2013.

Sao, Huiji; Tang, Jiliang; Hu, Xia; and Liu, Huan. "Exploring temporal effects for location recommendation on location-based social networks". In Proceedings of the 7th ACM conference on Recommender systems, pp. 93-100. ACM, 2013.

Gao, Huiji; Tang, Jiliang; Hu, Xia; and Liu, Huan. "Modeling temporal effects of human mobile behavior on location-based social networks". In Proceedings of the 22nd ACM international conference on Information & Knowledge Management, pp. 1673-1678. ACM, 2013.

Geng, Liqiang and Hamilton, Howard J. "Interestingness measures for data mining: A survey". ACM Computing Surveys (CSUR), 38(3):9, 2006.

Hearst, Marti A. "Clustering versus faceted categories for information exploration". In Communications of the ACM, 49(4):59-61, Apr. 2006.

Hearst, Marti. "Search user interfaces". Cambridge university press, 2009.

Heimonen, Tomi. "Mobile Findex: Facilitating information access in mobile web search with automatic result clustering". In Advances in Human-Computer Interaction, 2008.

Jamali, Mohsen and Ester, Martin. "A matrix factorization technique with trust propagation for recommendation in social networks". In Proceedings of the fourth ACM conference on Recommender systems, pp. 135-142. ACM, 2010.

Jamali, Mohsen and Ester, Martin. "TrustWalker: a random walk model for combining trust-based and item-based recommendation". In Proceedings of the 15th ACM SIGKDD international conference on Knowledge discovery and data mining, pp. 397-406. ACM, 2009.

Jhaver, Shagun; Karpfen, Yoni; and Antin, Judd. "Algorithmic anxiety and coping strategies of airbnb hosts". In Proceedings of the 2018 CHI Conference on Human Factors in Computing Systems, p. 421. ACM, 2018.

Kayacik, Claire; Chen, Sherol; Noerly, Signe; Holbrook, Jess; Roberts, Adam; and Eck, Douglas. "Identifying the intersections: User experience + research scientist collaboration in a generative machine earning interface". In Extended Abstracts of the 2019 CHI Conference on Human Factors in Computing Systems, CHIEA '19, pp. CS09:1-CS09:8, New York, NY, USA. ACM. 2019.

Koren, Yehuda; Bell, Robert; and Volinsky, Chris. "Matrix factorization techniques for recommender systems". Computer, (8):30-37, 2009.

Lian, Defu; Zhao, Cong; Xie, Xing; Sun, Guangzhong; Chen, Enhong; and Rui, Yong. "Geomf: joint geographical modeling and matrix factorization for point-of-interest recommendation". In Proceedings of the 20th ACM SIGKDD international conference on Knowledge discovery and data mining, pp. 831-840. ACM, 2014.

Lim, Brian Y. and Dey, Anind K.. "Design of an intelligible mobile context-aware application". In Proceedings of the 13th International Conference on Human Computer Interaction with Mobile Devices and Services, MobileHCI '11, pp. 157-166, New York, NY, USA. ACM.2011.

Lin, Xiao; Chen, Hongjie; Pei, Changhua; Sun, Fei; Xiao, Xuanji; Sun, Hanxiao; Zhang, Yongfeng Ou, Wenwu; and Jiang, Peng. "A pareto-efficient algorithm for multiple objective optimization in

(56) References Cited

OTHER PUBLICATIONS e-commerce recommendation". In Proceedings of the 13th ACM Conference on Recommender Systems, ReeSys '19, pp. 20-28, New York, NY, USA. ACM, 2019.

Liu, Mengxiong; Liu, Zhengchao; Zhang, Chao; Zhang, Keyang; Yuan, Quan; Hanratty, Tim; and Han, Jiawei. "Urbanity: A system for interactive exploration of urban dynamics from streaming human sensing data". In Proceedings of the 2017 ACM on Conference on Information and Knowledge Management, pp. 2503-2506. ACM, 2017.

Liu, Yiding; Pham, Tuan-Anh Nguyen; Cong, Gao; and Yuan, Quan. "An experimental evaluation of point-of-interest recommendation in location-based social networks". VLDB, 10(10):1010-1021, 2017.

Lumsden, Joanna. "Emerging Perspectives on the Design, Use, and Evaluation of Mobile and Handheld Devices". IGI Global, 2015.

Naver Blog entitled "Tasty and enjoyable discovery 'Smart Around' starts beta service", 2018.

Oliveira, Guilherme N; Sotomayor, Jose L; Torchelsen, Rafael P; Silva, Cláudio T; and Comba, João L. D. "Visual analysis of bike-sharing systems". Computers & Graphics, 60:119-129, 2016.

Omidvar-Tehrani, Behrooz; Souza Neto, Placido A.; Freire Pontes, Felipe M.; and Bento Da Silva Junior, Francisco. "GeoGuide: An interactive guidance approach for spatial data". In 2017 IEEE International Conference on Internet of Things (iThings) and IEEE Green Computing and Communications (GreenCom) and IEEE Cyber, Physical and Social Computing (CPSCom) and IEEE Smart Data (SmartData), Exeter, United Kingdom, pp. 1112-1117, Jun. 21-23, 2017.

Omidvar-Tehrani, Behrooz; Viswanathan, Sruthi; Roulland, Frederic; Renders, Jean-Michel, "SAGE: Interactive State-aware Point-of-Interest Recommendation", Workshop of State-based User Modeling, co-located with ACM International Conference on Web Search and Data Mining (WSDM) Conference, Houston Texas, USA, Feb. 4-7, 2020.

Paay, Jeni; Kjeldskov, Jesper; Skov, Mikael B; Nielsen, Per M; and Pearce, Jon. "Discovering activities in your city using transitory search". In Proceedings of the 18th International Conference on Human-Computer Interaction with Mobile Devices and Services, pp. 387-393. ACM. 2016.

Pahin, Cicero A. L.; Omidvar-Tehrani, Behrooz; Amer-Yahia, Sihem; Siroux, Valerie; Pepin, Jean-Louis; Botel, Jean-Christian; and Joao, Comba. "COVIZ: A system for visual formation and exploration of patient cohorts". In VLDB, 2019.

Rentmeesters, Mark J; Tsai, Wei K; and Lin, Kwei-Jay. "A theory of lexicographic multi-criteria optimization". In Proceedings of ICECCS'96: 2nd IEEE International Conference on Engineering of Complex Computer Systems (held jointly with 6th CSESAW and 4th IEEE RTAW), pp. 76-79. IEEE, 1996.

Ribeiro, Marco Tulio; Ziviani, Nivio; Silva De Moura, Edleno; Hata, Itamar; Lacerda, Anisio; and Veloso, Adriano. "Multiobjective pareto-efficient approaches for recommender systems". In ACM Transactions on Intelligent Systems and Technology (TIST), 5(4):53, 2015.

Rodriguez, Mario; Posse, Christian; and Zhang, Ethan. "Multiple objective optimization in recommender systems". In Proceedings of the Sixth ACM Conference on Recommender Systems, ReeSys '12, pp. 11-18, New York, NY, USA, 2012. ACM.

Séguin, Julie Anne; Scharff, Alec; and Pedersen, Kyle. "Triptech: A method for evaluating early design concepts". In Extended Abstracts of the 2019 CHI Conference on Human Factors in Computing Systems, CHI EA '19, pp. CS24:1-CS24:8, New York, NY, USA, 2019. ACM.

\* cited by examiner

METHOD OF LOCATING POINTS OF INTEREST IN A GEOGRAPHIC AREA

This application claims the benefit of earlier filing date and right of priority to European Patent Application Number EP 20305404.4, entitled "Object Recommendation Using Ambient Mindsets" and filed on Apr. 24, 2020, the contents of which are hereby incorporated by reference in their entirety.

The present disclosure generally relates to a computer-implemented method for locating or recommending points of interest for a user in a geographic area. The method uses the computer to (a) optimize a plurality of current state functions, (b) rate a plurality of points of interest with respect to at least one of the plurality of optimized current state functions and, (c) based on the rating, automatically select a set of points of interest from the plurality points of interest. The robustness of the method is further enhanced when performing lexicographic optimization with approximation ratios.

BACKGROUND

Systems for automatically locating or recommending objects, such as geographic points-of interest (POIs), have shortened the exploratory search for everyday activities, such as following the news, watching series, and shopping. Recommendations made with such systems are a result of learning implicit preferences of a user using their historical activities. However, the current situation or state of a user is more important than past activities for recommendations, such as location-based recommendations of POIs.

Systems for recommending and exploring POIs, are emerging in various location-based applications, such as user profiling, localized advertising, tour planning, bike sharing, and urban management. POI recommendation is a prominent application in location-based services, where the goal is to predict the POIs users might prefer to visit in the near future, based on their historical activities (Jie Bao, Yu Zheng, David Wilkie, and Mohamed Mokbel: "Recommendations in location-based social networks: a survey", Geoinformatica, 2015). In these systems (often including recommendation engines), the current context and situational needs of the user may not be considered by the recommendation engine. On the other hand, POI exploration (i.e., exploratory POI search) aims to enable users to navigate through a plethora of POIs in a guided fashion, and gradually land on a subset of interest. Result exploration enables users to have more control over the content and demonstrate their actual context and situational needs. While recommendation results are not flexible enough to be controlled by the end-user, the exploration process can be easily managed just by exploring a different set of keywords. However, with a large number of available POIs, the exploration process becomes burdensome and less expeditious for the user. It is important for users to incorporate their actual context and situational needs into recommendation and exploration of POIs, but current methods do not fully satisfy this requirement.

In the literature, contextuality is proposed to incorporate user needs in POI recommendation and exploration systems. Context is by default materialized as the current time and location of the user. Geographical context is modeled in the form of "distance", following the Tobler's intuition that near things are more related than distant things. In addition, the spatial characteristics of POIs have been enriched with a temporal context in a separate abstraction layer. While these approaches capture some aspects of user needs, there are still many fundamental facets of needs, which have remained unaddressed. For example, an intent of a user, an actual situation of a user, and an emotion of a user cannot be easily captured with the above context paradigms.

Conventional approaches propose various models to compile categories and help users navigate in the space of POIs. U.S. Pat. No. 10,289,648 B1 enforces category diversity by ranking candidate POIs into one or more common categories, such as museums and restaurants. U.S. Pat. No. 10,018,480 B2 selects POIs based on a user request for location-based data. U.S. Pat. No. 8,983,973 B2 discloses systems and methods for ranking POIs that make use of a geographic location of the user, an initial prior voting of POIs by the user, information from the user's social networks and search inputs related to the traversing route of the user. Once categories are compiled, different approaches are proposed to explore and recommend POIs. In CN 104731846 A, collection of data on a user's behavior permits food recipes and nutrition recommendations to be generated through a multi-target optimization.

However, conventional methods often rely on information about a single user and thus provide results specific to the behavior of the user. Accordingly, these methods are prone to inaccurate recommendations when the settings of the user would be used by different users with a different behavior. These methods provide recommendations based on a specific behavior of a user and cannot recover to provide accurate results for different users.

Traditionally, the problem of POI recommendation is defined as learning implicit preferences of a user according to historical check-ins of the user (Jie Bao, Yu Zheng, David Wilkie, and Mohamed Mokbel: "Recommendations in location-based social networks: a survey", GeoInformatica, 2015). To solve this problem, one approach employs memory-based and model-based Collaborative Filtering (CF) as de facto methods, where a check-ins matrix is used for learning preferences (Betim Berjani and Thorsten Strufe: "A recommendation system for spots in location-based online social networks", in Proceedings of the 4th workshop on social network systems, 2011).

However, this approach requires personal data of the user. Obtaining personal data of a user provides a security risk for the user, since this data may be intercepted. Moreover, when conventional methods do not have access to the personal data of a user, a plurality of functions of these state-of-the-art methods cannot be used or the methods may not function in a desired way. This problem is also known as "the cold start challenge".

State-of-the-art methods show fundamental problems. Some of these problems include:

The problem of cold start, which arises when a user with a limited history of interactions with a system asks for recommendations. Data sparsity refers to the lack of data for identifying similarities between users. Many users employ POI services without signing in. As a result, no social graph (i.e., friendship relations) can be retrieved. A typical recommendation system, which relies on historical data and user similarities for personalized and socialized recommendations, is unable to output results in the presence of cold start and data sparsity. There are two kinds of users which may cause a cold start: (i) a new user with no history, and/or (ii) a user with privacy concerns who does not want his/her data to be exploited.

Another challenge for a recommender is to integrate the context of the user into the recommendation process. The context is not limited to time and/or location, but also to an intent of a user at the time of receiving recommendations. For instance, different POIs should be recommended in case the user is hungry, or in case the user is seeking some personal relaxation time.

Further, users may not trust in what they get from the recommender, i.e., algorithmic anxiety due to the cold start problem and session-based interactions with the system. Users may want to know why they received certain POIs as recommendation results. The challenge of recommendation transparency is a long-standing problem.

Finally, conventional methods are not very robust to changes. For example, once a user or the behavior of a user changes, the recommendations may not be effective or accurate, since the recommendations are based on outdated data.

Accordingly, there is a need in the art to address these problems for object recommendation. It is therefore desirable to provide an improved method of object recommendation—including POI recommendation—that overcomes the above disadvantages of the prior art. Specifically, it is desirable to provide a method that accurately, efficiently, and effectively generates object recommendations in a secure and robust manner.

SUMMARY

The disclosed embodiments are directed toward a technical improvement for performing lexicographic optimization with a computer to solve a multi-objective optimization problem. More particularly, in one embodiment, a computer-implemented method of locating points of interest for a user comprises: receiving an input from the user, the input from the user relating to at least one current state of the user; wherein (a) the at least one current state of the user corresponds with at least one of a plurality of current state functions, and (b) the plurality of current state functions respectively include a plurality of utility measure sets where (i) each utility measure set includes a plurality of utility measures with each utility measure comprising a score corresponding with one or more points of interest, and (ii) the plurality of utility measures of each utility measure set are ordered in a selected sequence; using the computer to perform lexicographic optimization with respect to the plurality of current state functions so that the selected sequence of each utility measure set is optimally ordered; using the at least one current state of the user as an index into a list including both the plurality of current state functions with the respective plurality of utility measure sets to select at least one of the plurality of current state functions; using the computer to both (a) rate a plurality of points of interest with respect to the selected at least one of the plurality of current state functions, and (b) based on said rating, automatically select a set of points of interest from the rated plurality points of interest; and providing the set of points of interest to the user.

The method, as defined by the claims, is both robust and reliable since it is less prone to errors. For example, a point of interest may yield a wrong optimal score for one objective (i.e, one utility measure) due to wrong values associated with this point of interest; however, these wrong values may have no effect on another objective. Accordingly, when multiple objectives are optimized in accordance with the claimed method, greater reliability is obtained.

In one aspect of the one embodiment, the selection of at least one of the plurality of current state functions may include selecting a first current state function and a second current state function; and the rating of the plurality of points of interest may include rating the plurality of points of interest with respect to both the first and second current state functions.

In another aspect of the one embodiment, the computer-implemented method further includes calculating, for each one of the plurality of utility measure sets, an approximation ratio for each one of at least two utility measures, wherein each approximation ratio reflects a degree of dominance of one of the utility measures with respect to at least one other utility measure in a common utility measure set. The selected sequence of each utility measure set may be ordered with a corresponding set of approximation ratios, and the approximation ratios may be based on user preferences of a plurality of users different from the user.

In one example, each approximation ratio may be calculated with the following relationship:

$$\zeta_m^i = \frac{4 - (w_m^i - 1)}{4}$$

where $\zeta_m^i$ is the i-th approximation ratio with respect to a current state function (m); and $w_m^i$ is the i-th average of participants' relevance scores with respect to m. Also, pursuant to performing lexicographic optimization with respect to the plurality of current state functions, the computer can be used to perform approximate lexicographic optimization with the approximation ratios. In another example, a learning model learns preferences of the user based on inputs of the user, and at least one of the plurality of current state functions or at least one of the approximation ratios is modified in accordance with the preferences of the user.

Use of approximation ratios allows for a significant number of objectives to be suitably considered in solving the multi-objective problem. This is in contrast to various known approaches where precedent objectives dominate all other consecutive objectives strictly. Additionally, use of approximation ratios permits objectives, as defined by utility measures, to be defined in a more precise manner than typically encountered with prior art methods.

In yet another aspect of the one embodiment, rating of the plurality of points of interest includes (i) rating different sets of points of interest, and (ii) calculating scores for the different sets of points of interest using at least two utility measures of the plurality of utility measures; and at least one utility measure of the at least two utility measures provides an optimal score for the selected set of points of interest. In one example, a utility measure of the at least two utility measures provides a score for the set of points of interest that is within a range, the range being defined by both an optimal score for the utility measure and an approximation ratio corresponding to the utility measure.

In yet another aspect of the one embodiment, the plurality of utility measure sets comprises at least a first utility measure set and a second utility measure set. In one example, (a) the first utility measure set includes a first number of utility measures and the second utility measure set includes a second number of utility measures, and (b) the first number of utility measures is different than the second number of utility measures. In another example, the first utility measure set includes a utility measure that is not in the second utility measure set. In yet another example, (a) the first utility measure set includes a first sequence of utility measures and the second utility measure set includes a second sequence of utility measures, and (b) the order of the first sequence of utility measures is different than the order of the second sequence of utility measures. Also, the order of each selected sequence of the plurality of utility measure sets may be based on user preferences of a plurality of users different from the user.

In another embodiment, a computer-implemented method of object recommendation comprises receiving an input from a user and selecting a mindset from a plurality of mindsets based on the input. The mindset comprises a label and a sequence of a plurality of utility measures. A utility measure may be a function that provides a score based on one or more properties of one or more objects. The method further comprises determining a set of objects of a plurality of objects based at least in part on the sequence of the plurality of utility measures and at least one approximation ratio. Each approximation ratio of the at least one approximation ratio corresponds to a different utility measure. Finally, the set of objects is provided to the user.

By recommending objects determined based on a mindset, the privacy of a user can be protected, which increases security for the user. Moreover, an approximation ratio provides recommendations that cover the preferences of a specific user without requiring any data about the user. The disclosed embodiments combine recommendations relating to the specific context of a user's needs by covering a broad spectrum of user preferences and security concerns of the user. The user does not need to specify specific questions to get recommendations that can reveal information about the user, which protects the privacy of the user. Accordingly, security is improved compared to recommender systems where the user is required to formulate a search query and thus inevitably offers information about his psychological state. For example, a user would phrase a query differently in a happy mood compared to a sad mood. This information is secure in the present recommender system. Conventional systems provide user-specific recommendations. However, if a user changes or if a plurality of "wrong" inputs is made that do not correspond to the preferences of a user, the method of the disclosed embodiments can recover due to the approximation ratio, which provides for a robust recommender system.

According to one aspect of the disclosed embodiments, the step of determining a set of objects comprises calculating scores for different sets of objects using at least two utility measures of the plurality of utility measures, wherein at least one utility measure of the at least two utility measures provides an optimal score for the set of objects compared to different sets of objects. The at least two utility measures may form a sequence. A utility measure of the at least two utility measures may provide a score for the set of objects that is within a range, the range being defined by an optimal score of a different set of objects and an approximation ratio corresponding to the utility measure. This provides a robust recommender system for providing recommendations in an effective manner.

The different sets of objects may be selected by replacing a first set of objects with a second set of objects by replacing at least a first object in the first set of objects with a second object until a last utility measure of the at least two utility measures provides for an optimal score for the second set of objects and all prior utility measures in the sequence of utility measures each provide a score for the second set of objects that is within a range, the range being defined by an optimal score of a different set of objects and an approximation ratio corresponding to a respective utility measure of the prior utility measures. Alternatively or additionally, the different sets of objects may be selected by replacing a first set of objects with a second set of objects by replacing a first object in the first set of objects with a second object, wherein a last utility measure of the at least two utility measures provides individual scores for all objects of a set of objects, and wherein the last utility measure provides a lower individual score for the first object compared to the individual score for the second object. As disclosed, the different sets of objects may be selected by replacing a first set of objects with a second set of objects using a Monte-Carlo method. By calculating individual scores, the optimal set of objects may be determined in an efficient and fast manner.

According to other aspects of the disclosed embodiments, the computer-implemented method comprises, prior to the step of determining a set of objects, determining the plurality of objects, such as a subset of objects of a larger set of objects, based on at least one of a location of the user, preferences of the user and a time or date associated with the input of the user. The time or date may be at least one of a time of a current day, a day of a current week, and a season of a current year. Alternatively or additionally, the plurality of objects may be determined based on a location of the user. The location of the user may be calculated or determined. Reducing the initial number of objects or candidates for the recommendation reduces the amount of data to be processed for finding the optimal set of objects. As disclosed, the set of objects may be determined based on the location of the user.

In another aspect of the disclosed embodiments, the mindset is combined with another mindset and the set of objects is based on the combined mindsets. The plurality of objects may comprise Points-of-Interest, POIs. In yet another aspect, a learning model learns preferences of the user based on user inputs and modifies the mindsets and/or the at least one approximation ratio in accordance with the preferences of the user. This allows effective recommendations. The sequence of the plurality of utility measures may be a predefined sequence. An order of a utility measure in the sequence of utility measures may correspond to a priority or an importance of the utility measures for the mindset in determining the set of objects.

DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

In the drawings, reference numbers may be reused to identify similar and/or identical elements.

DETAILED DESCRIPTION

A. System Architecture

It should be appreciated that the disclosed embodiments can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over communication links. Applications, software programs or computer readable instructions may be referred to as components or modules. Applications may take the form of software executing on a general-purpose computer or be hardwired or hard coded in hardware. Applications may also be downloaded in whole or in part through the use of a software development kit, framework, or toolkit that enables the creation and implementation of the disclosed embodiments. In general, the order of the steps of disclosed processes may be altered within the scope of the disclosed embodiments.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Figure 1:
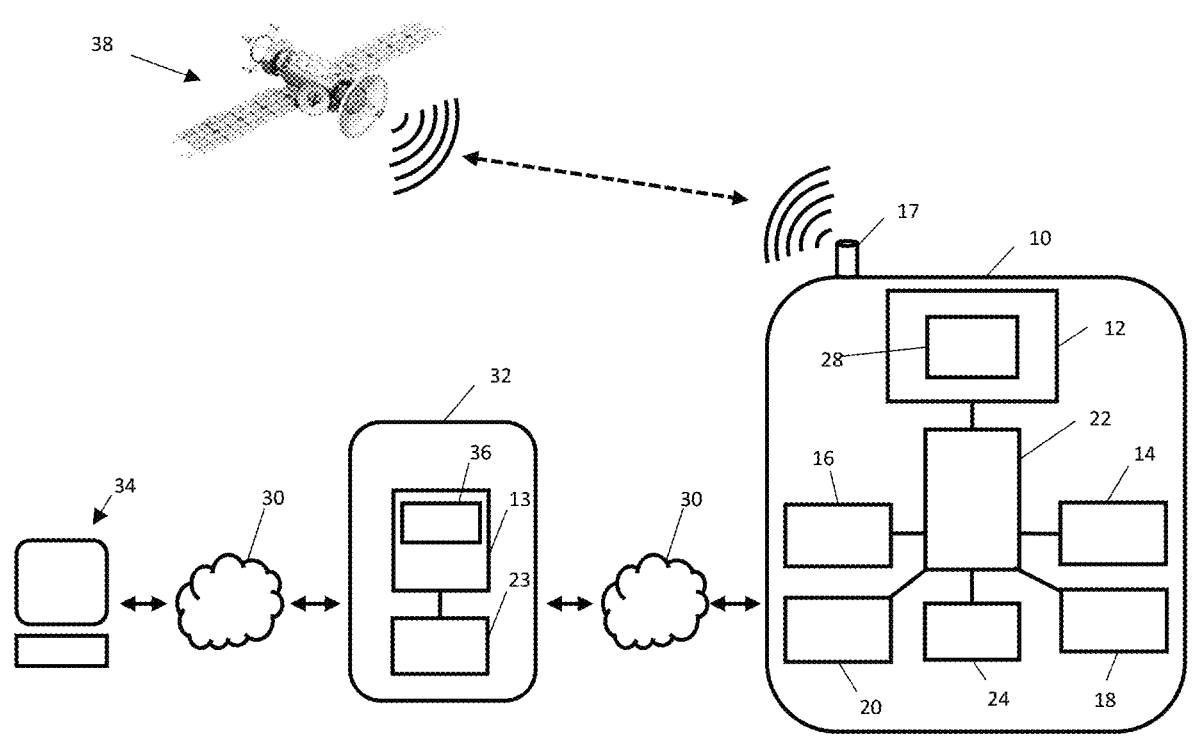
FIG. 1 illustrates a schematic, diagrammatic drawing of one exemplary architecture in which the disclosed embodiments may be performed.

With reference to FIG. 1, a block diagram of a system architecture in which a mobile device 10 may operate is illustrated. The mobile device 10 in this embodiment includes: an operating system 12, an input device 14, a radio frequency transceiver(s) 16, an antenna 17, a visual display or screen 18, and a battery or power supply 20. Each of these components is coupled to a processor circuit 22. The mobile device 10 further includes a GPS communications interface 24, the significance of which will appear below. The device operating system 12 runs on the processor circuit 22 and enables interaction between application programs and the mobile device hardware components.

The term processor circuit, as used herein, may encompass a single processor circuit or multiple processor circuits that executes some or all computer readable instructions or computer program code from multiple modules. A client computer embodying the one or more processing circuits may include, but not limited to, CPUs (Central Processing Units), memory/storage devices, communication links, communication/transmitting devices, I/O devices, or any subcomponents or individual parts of one or more processing circuits, including software, firmware, hardware, or any combination or subcombination thereof.

In an embodiment, the mobile device 10 receives and transmits data through the antenna 17 using the RF transceiver(s) 16 which may be able to communicate via various networks, for example: Bluetooth, local area networks such as WiFi, and cellular networks such as GSM or CDMA. In addition, the disclosed embodiments may be used in conjunction with a position locating system including a GPS satellite 38 and the antenna 17. In one embodiment, location information is obtained through use of a GPS communications interface 24 in conjunction with GPS satellite 38 and antenna 17. In an alternate embodiment, location information is obtained through use of the GPS communications interface 24 in conjunction with information stored locally on the mobile device 10.

In an embodiment, a local software component 28 is an application program that is downloaded to the mobile device 10 and installed so that it integrates with the operating system 12. In one embodiment, the local software component 28 can be device, platform or operating system specific.

Referring still to FIG. 1, a server 32 is provided with server software 36 and an operating system 13 that runs on processor circuit 23. The server software 36 on the server 32 includes functionality to allow two-way communication between the server 32 and the mobile device 10, as well as two-way communication between the server 32 and the client computer 34 also through network 30, which in one embodiment is the Internet. The server software 36 on the server 32 may enable the client computer 34 to update information accessible by the mobile device 10, such as points of interest information. The server software 36 may also enable the mobile device 10 to communicate with the client computer 34 to deliver feedback about points of interest information.

Furthermore, the server software 36 may allow points of interest data, such as location-related information, pictures, reviews and ratings to be transferred from the mobile device 10 to the client computer 34 and from the client computer 34 to the mobile device 10. In an embodiment, the server software 36 generates a web page for display on the client computer 34 which allows an authorized user to use remote access and configuration controls relating a general point of interest database on server 32. In an embodiment, the server 32 also includes a database that is used to store backed-up data and other information from the mobile device 10, such as a user specific point of interest database, that the user may share in whole or in part with other users.

Of course, it is understood by those of ordinary skill in the art that the functionality performed by server 32 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality.

B. System Functionality

Figure 2:
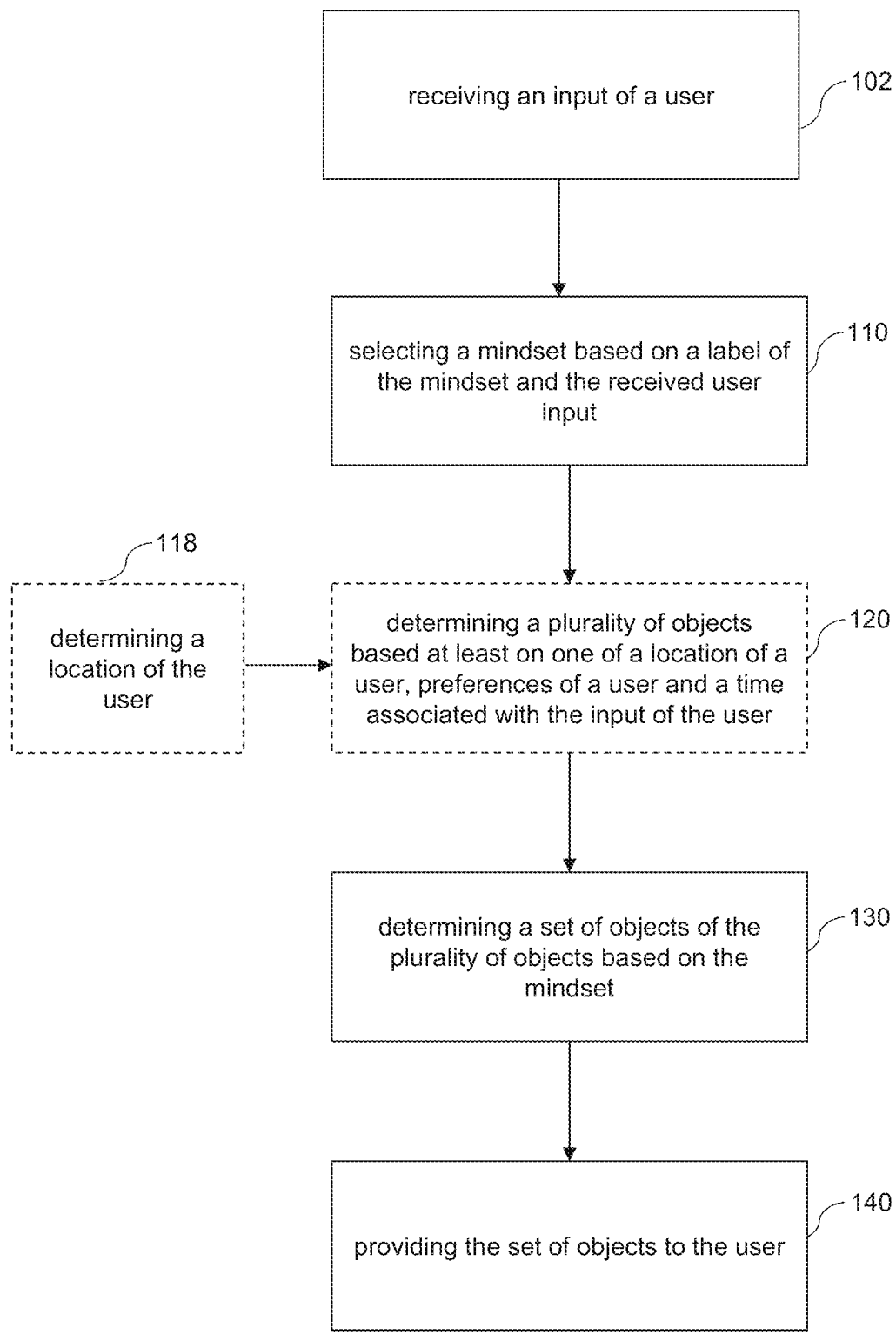
FIG. 2 illustrates a process flow diagram of a method for object recommendation in accordance with at least one embodiment.

FIG. 2 is a process flow diagram of an exemplary method 100 of object recommendation in accordance with an embodiment. In the method comprises receiving an input from a user.

At step 102, the method comprises receiving an input from a user. The input corresponds with a current state of the user, such as one or more mindsets. In step 110, a current state function(s) or mindset(s) is selected based on the mindset. For example, the user may select a mindset based on a label of the mindset (i.e., a current state of the user) presented to the user. The current user state or label may describe the current state function or mindset in a manner so that the user understands the function of the mindset. For example, the label may describe current needs of users, such as "I'm hungry". Furthermore, the mindset or current state function comprises a sequence of a plurality of utility measures or functions. Different mindsets of the plurality of mindsets may comprise at least one of: a different number of utility measures, a different sequence of utility measures, and different utility measures. A utility measure provides a score for an object (e.g., point of interest) and/or a set of objects with respect to at least one property of the object or set of objects. Each mindset or the respective label may be formalized as a search query template. A mindset may bias recommendations towards the user's needs. The mindsets or current state functions may correspond to categories such as "I'm hungry" and "Surprise me", presented on a suitable interface, such as visual display 18 of FIG. 1.

At step 118, a location of the user may be determined. As illustrated by FIG. 1, the location of the user may be determined by a tracking system, such as a Global Positioning System (GPS) tracking system or Real-time locating systems (RTLS). In an embodiment, the location of the user is determined by means of a Wi-Fi positioning system.

At step 120, the method may comprise the step of determining a plurality of objects based on at least one of a location of the user, preferences of the user and a time or date associated with the input of the user. The plurality of objects may be determined from a dataset and may be a subset of objects stored in the dataset. This preselection of relevant objects allows a fast and efficient computation to determine a set of objects that are recommended to the user. For example, referring to FIG. 1, the computation can be performed offline on a mobile device. The time or date may be at least one of a time of a current day, a day of a current week, and a season of a current year. In an embodiment, a plurality of objects and/or a set of objects are determined based on the location of the user. Objects may be any kind of candidates or items that can be recommended to a user. For example, as disclosed herein, objects may comprise Points-of-Interest (POIs). A POI is a specific point location that someone may find useful or interesting. Typical examples of POIs are businesses (which may include restaurants, cafes, and banks), transportation centers (which may include train and bus stations, airports), monuments, and geographic formations.

While embodiments of the summary and the description are presented with respect to point-of-interest recommendation, those skilled in the art will appreciate that the following embodiments may be used for object or candidate recommendations, where one or more objects and/or candidates are provided to the user. As follows from FIG. 1, the dataset may be retrieved from a server or a computer remote to a computing device, e.g., a mobile computing device or a car, on which the method 100 may be performed. In an embodiment, each object in the dataset is associated with a time or a period, such as morning, afternoon, or evening, and the object is only retrieved for a specific time or a specific period, which is associated with the input of the user or corresponds to preferences of the user. By retrieving objects only for a specific time or a specific period, the data to be processed for determining a set of objects to be recommended to the user may be reduced. A set may comprise one or more elements, e.g., a set may comprise one, two, three, four, five or 15 elements, and may be referred to as a "bundle" in the following description.

At step 130, a set of objects of a plurality of objects is determined based on the mindset. Specifically, the set of objects may be determined based at least in part on the plurality of utility measures, the sequence of the plurality of utility measures specific for the mindset and at least one approximation ratio. Each approximation ratio of the at least one approximation ratio corresponds to a different utility measure. An approximation ratio may define a range used in finding an optimal set of objects. The range may soften an optimization process so that a set of objects is regarded as an optimal set of objects although it does not provide an optimal score for all utility measures used in the optimization process.

Figure 5:
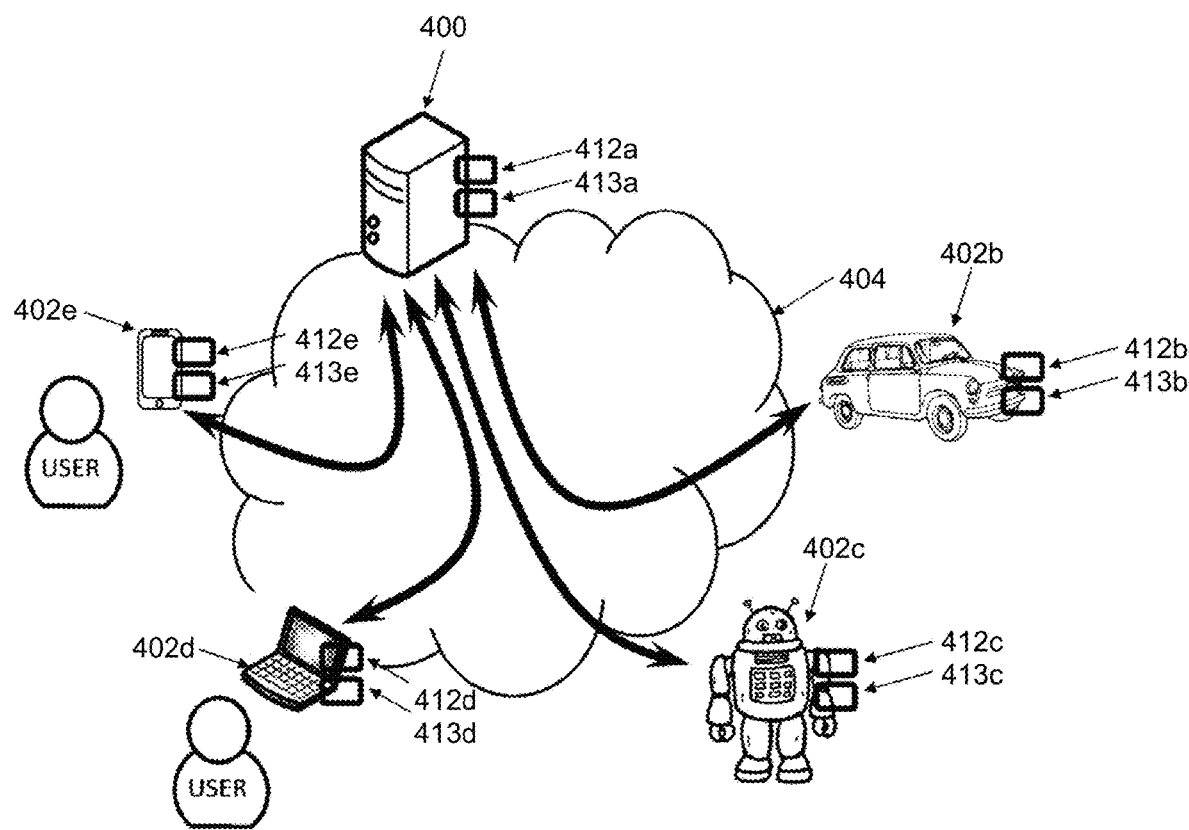
FIG. 5 illustrates a schematic, diagrammatic drawing of another exemplary architecture in which the disclosed embodiments may be performed.

At step 140, the method comprises providing the set of objects (which, in one example, includes POIs) to the user. Providing the set of objects to the user may comprise displaying the set of objects to the user, e.g., displaying the set of objects on a display of a mobile device of the user (such as display 18 of FIG. 1) or on a display of a car (FIG. 5). After the set of objects is provided to the user, the user may select one of the objects or perform another interaction with the system, such as selecting a different mindset of interest for the user.

Aspects of the above-described method, such as the use of mindsets to facilitate the functionality of object recommenders, are disclosed in U.S. patent application Ser. No. 16/945,043 to the same inventors as the subject application. The publication of the '043 Application, namely U.S. Patent Application Publication No. 2021-0160653, the contents of which are hereby incorporated by reference in their entirety, discloses an interactive, state aware POI recommending system exploiting look-alike groups mined in public POI datasets. The recommending system also defines and employs mindsets for capturing the actual state of a user and enforce the semantics of POI interestingness. As indicated in U.S. Patent Application Publication No. 2021-0160653:

As each mindset function is constructed as a combination of several utility functions, maximizing mindset functions is a multi-objective optimization problem. However, a scalarization approach may be employed using user-specific weights and priors to reduce the complexity of the problem to single-objective optimization. In an embodiment, a multi-objective optimization approach is employed to obtain groups. In an embodiment, a greedy-style algorithm may be employed to maximize mindset functions Much of the disclosure of the Publication of the '043 Application is described in Behrooz Omidvar-Tehrani, Sruthi Viswanathan, Frederic Roulland, and Jean-Michel Renders: "SAGE: Interactive State-aware Point-of-Interest Recommendation," ACM, Feb. 7, 2020 ("SAGE Publication"), the contents of which are hereby incorporated by reference in their entirety.

As should appear, the present specification, in contrast to the Publication of the '043 Application and the SAGE Publication, specifically discloses and claims the use of lexicographic optimization to solve a multi-objective optimization problem. As should further appear, the present specification, in contrast to the Publication of the '043 Application and the SAGE Publication, specifically discloses and claims the use of approximation ratios to facilitate the ordering of utility measure sequences.

Figure 3A:
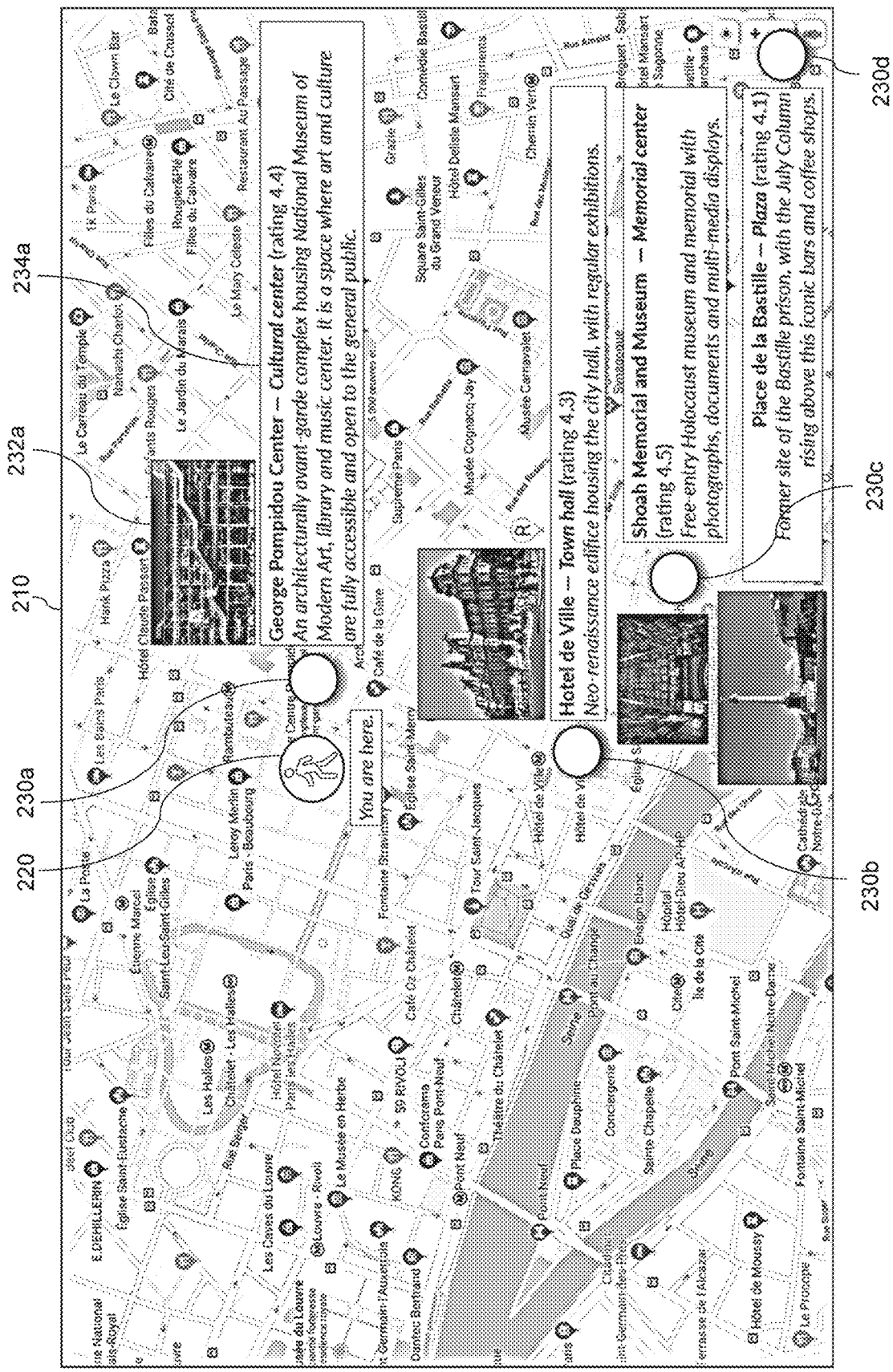
FIGS. 3A and 3B illustrate examples of an application in accordance with an embodiment.
Figure 3B:
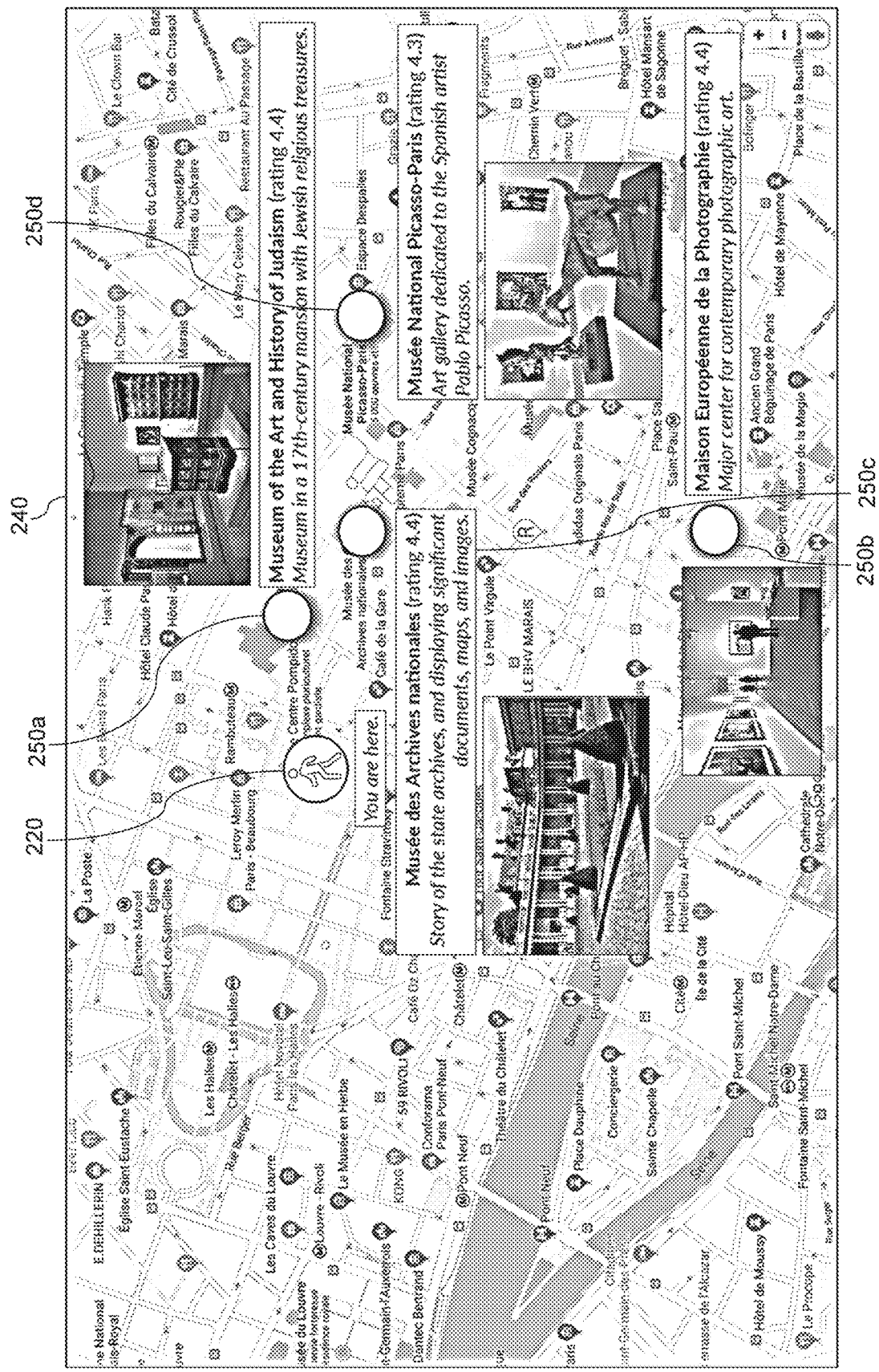

An example of how the set of objects (which, in one example, comprises POIs) may be displayed to the user is illustrated in FIGS. 3A and 3B. In the examples of FIGS. 3A and 3B, the objects are shown as POIs. Also, as will be appreciated by those skilled in the art, these maps may be both generated and displayed with the system of FIG. 1.

FIG. 3A shows a map 210 of a part of a city, in this example Paris. In the map 210, a location 220 of the user may be indicated. It is assumed that the user is at the George Pompidou Center (in 18th district of Paris) in the evening. Further, FIG. 3A shows a set of POIs 230a, 230b, 230c and 230d, which have been recommended to the user. These POIs 230a-230d may have been determined in accordance with the method of an embodiment. The set of POIs 230a-230d may correspond to a specific mindset, such as to the mindset labeled "I'm new here". For the mindset, four POIs may be recommended, marked with circles, which may be colored. However, the number of POIs in a set of POIs is not Quantified mindsets mirror a transparent explanation of how the POIs are selected for recommendation to users. Each mindset may comprise semantics of how the interestingness of POIs are computed. Mindset quantification may be defined as follows.

Definition 1 (Mindset quantification). Mindset quantification includes finding a POI bundle with k POIs (k being predefined or user-defined) that are relevant to the actual context of the user, encapsulated in form of mindsets.

TABLE 1

Exemplary mindsets with their labels (column 1), paraphrased descriptions (column 2), and an order of POI utility measures (column 3).

| Mindset label | Description | Order of utility measures |
|---|---|---|
| m1: I'm new here | towards touristic POIs about the popular attractions in the city | popularity ($f_{m1}^1$) → prestige ($f_{m1}^2$) → diversity ($f_{m1}^3$) → recency ($f_{m1}^4$) → category ($f_{m1}^5$) → crowd⊥ ($f_{m1}^6$) |
| m2: Surpriseme | towards POIs which haven't been visited before by the user and are uncommon (seldom visited) | surprisingness ($f_{m2}^1$) → popularity ($f_{m2}^2$) → prestige ($f_{m2}^3$) → diversity ($f_{m2}^4$) → size ($f_{m2}^5$) |
| m3: Let's exercise | towards POIs related to physical exercises like swimming pools, parks, gyms, and mountains | category ($f_{m3}^1$) → popularity ($f_{m3}^2$) → prestige ($f_{m3}^3$) → coverage ($f_{m3}^4$) |
| m4: Me time | towards POIs related to activities to treat oneself and and have solo time to unwind and relax | category ($f_{m4}^1$) → coverage⊥ ($f_{m4}^2$) → crowd⊥ ($f_{m4}^3$) → popularity ($f_{m4}^4$) → prestige ($f_{m4}^5$) |
| m5: I'm hungry | towards getting faster access to food-related POIs nearby | category ($f_{m5}^1$) → coverage⊥ ($f_{m5}^2$) → prestige ($f_{m5}^3$) → recency ($f_{m5}^4$) |
| m6: Let's learn | towards POIs such as museums, libraries and cultural landmarks | category ($f_{m6}^1$) → prestige ($f_{m6}^2$) → freeness ($f_{m6}^3$) → diversity ($f_{m6}^4$) → coverage ($f_{m6}^5$) |
| m7: Hidden gems | towards small intriguing local POIs that are highly rated but not necessarily popular | popularity⊥ ($f_{m7}^1$) → prestige ($f_{m7}^2$) → size⊥ ($f_{m7}^3$) → recency ($f_{m7}^4$) → crowd⊥ ($f_{m7}^5$) |
| m8: What's free? | towards POIs without any costs | freeness ($f_{m8}^1$) → popularity ($f_{m8}^2$) → recency ($f_{m8}^3$) → diversity ($f_{m8}^4$) |
| m9: Meet people | towards social POIs to meet new people | category ($f_{m9}^1$) → crowd ($f_{m9}^2$) → popularity ($f_{m9}^3$) → recency ($f_{m9}^4$) → diversity ($f_{m9}^5$) → surprisingness ($f_{m9}^6$) | limited to four. The number of POIs in a set of POIs may be predefined or selected by a user and can comprise one or more elements.

Each POI of a set of POIs may comprise a brief explanation of the POI, such as explanation 234a, and additional data, such as an image 232a. Each POI of the set of POIs can be selected by the user. For example, a user may select a POI 230c of the set of POIs 230a-230d. This may comprise clicking a touchscreen of a device to select the POI. However, alternative methods can be used to select a POI, such as a voice command or an input on a virtual or physical keyboard.

FIG. 3B shows a different recommendation of POIs 250a-250d on map 240, namely a recommendation for a mindset labeled "What's free?". Again, each POI of the set of POIs 250a-250d can be selected by the user. In response to a selection of a POI, a user can start navigation to the POI or perform a new selection according to some or all steps of the method according to FIG. 2 for a new recommendation of sets of POIs. The user input or interaction of the last selection may be taken into account for a new recommendation. The way users can select their mindsets (e.g., "Me time", "I'm hungry") enables users to enforce their context to the recommendation system and may bias the results towards what they are interested to receive, without revealing detail about themselves by typing explicit queries.

Mindsets can be quantified, e.g., to determine a POI bundle (i.e., a set of POIs) which are relevant to the mindset. A current state function or mindset m may be defined as a tuple m={ (label,func(.)) , where m.label (or current state of the user) provides a concise description of the mindset (exemplarily shown in the first column of Table 1), and m.func(.) quantifies the mindset m by defining semantics of POI interestingness. m.func(.) may be a function that evaluates POIs based on the mindset m. For instance, in the case m.label="I'm hungry", m.func(.) is formulated in a way to increase the interestingness of restaurants and coffee shops. Also in the case of m.label="let's learn", m.func(.) biases museums, libraries and cultural landmarks.

Current state or mindset functions may comprise one or several utility measures, i.e., measures that provide a score for an object, such as an interestingness score for POIs. A higher scored POI or set of POIs is more interesting, and hence has higher chances to be recommended and to be explored by the user. Given the set of all POIs P, a POI utility measure $f: 2^P \rightarrow [0, 1]$ may return a value between 0 and 1 which reflects the extent of interestingness for one or more POIs. Different utility measures can be considered for POIs, such as "popularity", "surprisingness", and "diversity".

TABLE 2

Descriptions of exemplary POI utility measures (P ⊆ P) to quantify mindsets.

| Utility measure | Description |
| --- | --- |
| popularity (P) | normalized average number of check-ins of P |
| prestige (P) | normalized average rating score of P |
| recency (P) | inverse difference between the current date and the average insertion date of P |
| coverage (P) | an area of a convex hull induced by the geographical location of POIs in P normalized by the size of the city |
| surprisingness (P) | normalized Jaccard distance between POI categories of P and POI categories of other POIs |
| category (P, cat) | normalized Jaccard similarity between the set category and the categories of P |
| diversity (P) | normalized average pairwise Jaccard distance between sets of POI categories in P |
| size (P) | normalized average radius of POIs in P |
| freeness (P) | inverse normalized average cost of P |
| crowd (P) | normalized number of people currently present at P |

Table 2 lists POI utility measures. For recommending objects different from POIs, different utility measures may be used. Furthermore, the number of utility measures is not limited and the utility measures may be defined in different ways based on the available data. For example, the "category" measure may use traditional POI categories of interest (e.g., café, bar, health and fitness). Accordingly, the dataset from which the scores are calculated preferably comprises an indication of a category.

For the "category" function, specification of POI categories is contemplated. Table 3 shows examples of specific categories for each mindset, such as café, bar, health and fitness. Note that m1, m7 and m8 are not related to the "category" measure, and hence are not shown in Table 3. Accordingly, for these mindsets no categories need to be specified.

TABLE 3

Categories of interest for mindsets

| Mindset | Categories of interest |
| --- | --- |
| m2: Surprise me | entertainment, art, gallery, sculpture, zoo, bookstore |
| m3: Let's exercise | sport fields, park, health and fitness, bowling, tennis court, ice skating |
| m4: Me time | outdoor, food, tea room, bar, coffee shop |
| m5: I'm hungry | food (e.g., restaurants, grocery stores, convenience stores, fast food) |
| m6: Let's learn | museum, performing art, historical site, gallery, exhibit |
| m9: Meet people | social club, bar, pub, event, nightlife spot, spiritual center |

The utility measures may be defined as maximization objectives, i.e., the larger the value of these measures, the more ideal the POI becomes to be recommended to the user. In contrast, minimization objectives are designated with a subscript symbol ⊥ (shown in the third column in Table 1).

As an example, the utility measure "popularity" can be defined as the number of annual visits of a POI or an average number of annual visits of a plurality of POIs. Given that the "Great Pyramids" of Egypt and "Notre Dame Cathedral" of France receive 14.7 million and 13 million annual visitors, respectively, and "Niagara Falls" receives the greatest number of visitors (i.e., 30 million), the popularity (Great Pyramids)=0.49, popularity (Notre Dame)=0.43, and popularity(Great Pyramids, Notre Dame)=0.46 (the average of the two). {Great Pyramids,Notre Dame, Niagara Falls}⊆P, where popularity (Niagara Falls)=1. The set of all utility measures is denoted as F.

In case the user requests a mindset m, the system should return a bundle or set of objects, such as a bundle of POIs, which optimizes m.func(.). In the case where m.func(.) is identified with one single objective (i.e., one single utility measure), then a straightforward single-objective algorithm can be employed to return objects with an optimal value of m.func(.). However, each mindset may comprise or may be associated with more than one utility measure. For instance, regarding the mindset m8 (What's free?) as shown in Table 1, it can be seen that not only is it a function of "freeness", but also of "popularity", "recency", and "diversity". Accordingly, POIs recommended for m8 should not only be free of cost, but they also need to have large number of check-ins (i.e., be popular), represent a recently opened/updated business (i.e., be recent), and be diverse enough to cover different regions of the city. The third column of Table 1 exemplarily lists a subset of utility measures for each mindset.

When each mindset is described with more than one utility measure or utility function, optimizing m.func(.) for a mindset m becomes a multi-objective optimization (MOO) problem. A system whose functionality depends on MOO is often denoted as a complex system. In lexicographic optimization, it is assumed that objectives are sorted in decreasing order of importance. Hence, the MOO boils down to solving one single-objective problem at a time in order of importance.

The order of importance for the utility measures can be derived from user data or a user study. As shown in the third column of Table 1, the term fi→fj means that the utility measure fi is more important (has a higher priority) than fj for a specific mindset. For instance, for m8, a qualitative experiment showed that the "freeness" measure is the most important, followed by "popularity". Accordingly, lexicographic optimization can be used to optimize mindset functions.

Therefore, a mindset comprises a sequence $F_m=(f_m^1, f_m^2, \ldots f_m^{|Fm|})$, where $f_m^i \in F$ is a utility measure in the i-th order, $1 \le i \le |F_m|$. The third column in Table 1 illustrates an exemplary Fm for each mindset. Accordingly, a mindset may define an order for a sequence of utility measures. For example, optimizing m.func(.) may comprise optimizing $f_m^1$ first, then $f_m^2$, and so on. Lexicographic optimization of mindset functions may be defined as follows.

Definition 2 (Lexicographic optimization). Given a mindset m and an object (e.g., POI) bundle $P \subseteq \mathcal{P}$, m.func(P) is optimized lexicographically, if the recursive conditions (i) and (ii) are met: (i) P is a maximizer of $f_m^1$; (ii) $\forall i=2 \ldots |Fm|$, P is a maximizer of $f_m^i$, subject to P being the maximizer of the sub-problem up to (i−1), i.e., $\forall j<i$, and $f_m^j(P) \ge f_m^{j*}$, where $f_m^{j*}$ is the maximal value for the j-th objective and the corresponding mindset function or utility measure, found in the j-th optimization sub-problem.

In Definition 2, $f_m^{j*}$ may not be the same as the maximum of $f_m^j$ considered independently, because new constraints are introduced for each sub-problem. In an embodiment, all measures are assumed to be maximization objectives. In case of minimization, other than all objectives getting minimized, other constraints stay the same.

The lexicographic nature of the optimization makes it highly sensitive to optimal values of precedent objectives. For instance, assume the mindset m8 (What's free?) is requested where $f_{m8}^1$="freeness". When $f_{m8}^2$, i.e., "popularity", is going to be maximized, all solutions (i.e., POI bundles) whose freeness is lower than the maximal value of "freeness" measure will not be materialized. As an example, consider two subsets of POIs P and P', where freeness(P)=1.0, popularity(P)=0.5, freeness(P')=0.95, and popularity (P')=0.7. The lexicographic optimization ignores P' despite its outstanding value of freeness because the highest value of freeness (as $f_{m8}^1$) is set to 1.0 by P and no lower value is accepted.

In an embodiment, the order of importance is a soft priority between utility measures because the predefined order may not perfectly correspond to the opinion of everyone. Accordingly, some margin can be considered, and precedent objectives do not dominate all other consecutive objectives strictly. Hence, an approximated (i.e., softened) multi-objective optimization approach is used, where "good enough" results can be preserved. This provides for a robust recommender system.

Given an approximation ratio $\zeta = [0, 1]$, x' is a $\zeta$-maximizer of the function $f(x)$ if and only if $f(x') \ge (1-\zeta) \cdot f^*$, where $f^*$ is the maximum value of $f(x)$. Similarly, x' is a $\zeta$-minimizer of the function $f(x)$ if and only if $f(x') \le (1+\zeta) \cdot f^*$ where $f^*$ is the minimum value of $f(x)$. The idea of $\zeta$-optimization allows for approximated lexicographic optimization.

Definition 3 (Approximated lexicographic optimization). Given a mindset m, a POI bundle $P \subseteq \mathcal{P}$, and an approximation ratio $\zeta = [0, 1]$, m.func(P) is optimized $\zeta$-lexicographically, if the recursive conditions (i) and (ii) are met: P is a $\zeta$-maximizer of $f_m$; (ii) $\forall i=2 \ldots |Fm|$, P is a $\zeta$-maximizer of $f_m^i$, subject to P being $\zeta$-maximizer of the sub-problem up to (i−1), i.e., $\forall j<i$, and $f_m^j(P) \ge (1-\zeta) f_m^{j*}$, where $f_m^{j*}$ is the maximal value for the j-th objective and the corresponding mindset function or utility measure, found in the j-th optimization sub-problem.

In embodiments of minimization objectives, the constraint in Definition 3 becomes $f_m^j(P) \le (1+\zeta) \cdot f_m^{j*}$. The approximated lexicographic optimization refines gradually an initial set of candidate solutions (the set composed of all $\zeta$-maximizers of $f_m^1$) by introducing more constraints as the order i increases. In embodiments, not all the |Fm| recursive sub-problems require solving. For example, the method can stop as soon as, for some i, only one solution P* remains.

The approximation ratio $\zeta$ softens the condition of precedent objectives. In the above example with the POI bundles P and P', P' would be accepted in a $\zeta$-lexicographical configuration, where $\zeta \ge 0.1$. While $\zeta$ in general is useful in widening the horizons of optimization, its value changes the process of optimization drastically. In case $\zeta=0.0$, no approximation will be applied. In case $\zeta=1.0$, no order will be preserved and objectives will be optimized independently.

For each mindset m, a list $\psi_m = (\zeta_m^1, \zeta_m^2 \ldots \zeta_m^{|Fm|})$ can be provided or generated, where $\zeta_m^i \in \psi_m$ is the approximation ratio of the utility measure $f_m^i \in F_m$. The values in $\psi_m$ reflect the degree of dominance. A low value of $\zeta_m^i$ means that its corresponding measure $(f_m^i)$ dominates its ensuing measures. In contrast, a high value of $\zeta_m^i$ means that $f_m^{i+1}$ is mostly independent from the optimal value of $f_m^i$.

To determine values in a list $\psi$, a crowdsourcing study can be used. In an experiment, a study has been performed in Amazon Mechanical Turk (AMT) with 402 participants. With an AMT population size of 500,000, the minimum number of participants needed for a 95% confidence level and 5% error margin can be calculated to be 384, using Survey Monkey's sample size calculator. In the experiment, 18 more users have been recruited than the minimum to cover incomplete tasks. They were tasked to score the relevance of utility measures to mindsets. The order of importance can be derived from the user experiment, with relevance scores coming from the mass. The relevance scores define the degree of dominance $\zeta_m^i$ for each utility measure $f_m^i$. For each mindset, the participants provide their opinion on the relevance of utility measures in Likert scale from 1 to 5, with 5 being perceived as the most relevant. Given $w_m^i$ as the average of participants' relevance scores, a corresponding approximation ratio can be calculated with the following equation:

$$\zeta_m^i = \frac{4 - (w_m^i - 1)}{4}$$

Table 4: Approximation ratios $\psi$ calculated for utility measures for approximate lexicographic optimization.

|  | $\zeta_m^1$ | $\zeta_m^2$ | $\zeta_m^3$ | $\zeta_m^4$ | $\zeta_m^5$ | $\zeta_m^6$ |
| --- | --- | --- | --- | --- | --- | --- |
| m1: I'm new here | 0.27 | 0.20 | 0.34 | 0.46 | 0.32 | 0.32 |
| m2: Surprise me | 0.21 | 0.38 | 0.23 | 0.36 | 0.40 | — |
| m3: Let's exercise | 0.19 | 0.33 | 0.23 | 0.35 | — | — |
| m4: Me time | 0.21 | 0.23 | 0.21 | 0.34 | 0.24 | — |
| m5: I'm hungry | 0.17 | 0.20 | 0.20 | 0.43 | — | — |
| m6: Let's learn | 0.18 | 0.22 | 0.28 | 0.19 | 0.31 | — |
| m7: Hidden gems | 0.27 | 0.23 | 0.32 | 0.38 | 0.25 | — |
| m8: What's free? | 0.17 | 0.24 | 0.39 | 0.21 | — | — |
| m9: Meet people | 0.20 | 0.27 | 0.22 | 0.38 | 0.32 | 0.28 |

Table 4 illustrates the approximation ratios that have been obtained from this crowdsourcing study. For instance, it can be observed that $\zeta_{m6}^1 = 0.18$, which means that the "category" utility measure $(f_{m6}^1)$ dominates ensuing utility measures to a great extent. This is because in m6 ("Let's learn"), the categories of POIs are very important, and only few categories should be considered (Table 3). $\zeta_{m1}^4 = 0.46$ implies that "recency" does not play a crucial role in m1 ("I'm new here") and hence should not dominate other utility measures.

Given the approximated lexicographic optimization model (Definition 3) enriched with ψ lists, m.func(.) can be optimized for a given mindset m.

---

Algorithm 1: Optimization of mindset function

---

Input: mindset m, a subset $P_r$ of "contextual" POIs, the size k of the bundle (number of POIs in the bundle), approximation ratio $\zeta_m$, maximum number of iterations T Output: bundle P of POIs that $\zeta$-approximately optimizes m.func(.) and |P| = k 1. P ← initialize (Pr, k) // initialization for $f_m^1$
2. for each $f_m^i \in F_m$, 1 ≤ i ≤ $|F_m|$ do
3.   while maximum number of iterations T is not reached do
4.     By enumeration, find the pair of POIs (p, p') with p ∈ P and p' ∈ $P_r$\P such that the new bundle P' = P ∪ {p'}\{p}:
       Has the highest $f_m^i$, among all feasible pairs;
       Satisfies the strict improvement condition: $f_m^i(P') > f_m^i(P)$; and
       ∀j < i, $f_m^j(P') \geq (1 - \zeta_m^j) \cdot f_m^j(\pi_j^*)$
       if such a pair exists then
         P ← P'
       else
         break
       end
5.   end
6.   $\pi_j^* \leftarrow P$
7. end
8. return P

---

Algorithm 1 applies approximated lexicographic optimization of several utility measures, according to an embodiment, for quantifying a given mindset. The quantification implies that relevant POIs are selected for mindsets. Hence, mindsets enable users to control which POIs they get by receiving POIs, which are in-line with their needs. The needs may be encapsulated as an explicit signal in different mindsets.

Algorithm 1 illustrates the main steps according to an embodiment. The algorithm admits as input a mindset m, the bundle size (i.e., a desired number of POIs to return, denoted as k), and a subset of candidate POIs P. The subset Pr contains POIs, which match the actual time, date and/or location of the user. Given the inputs, the algorithm checks each utility measure in their order enforced in Fm, and optimizes one measure at a time (lines 2 to 7). Each optimization process has at most T iterations to improve the optimized value (line 3). After at most T iterations, the algorithm stops optimizing $f_m^i$ and jumps to optimizing $f_m^{i+1}$. The method is a discrete hill-climbing-method, starting from a single feasible solution (line 1). Each step in the hill-climbing strategy corresponds to changing one POI of the current bundle by another one from the candidate subset, in order to improve (and even to maximize) the utility function of the current order, while satisfying the constraints induced by the previous orders. The choice of the optimal feasible pair may be done by enumerating all possible pairs (there are k×(n−k) such pairs, where n is the number of POIs in the subset Pr) and checking for the existence of an optimal pair and its corresponding candidate bundle P' (see line 4). For each successive order, it keeps track of the best (feasible) value that corresponds to that level, denoted as $\pi_j^*$ (see line 6), so that this value can be used to check the $\zeta$-optimality constraints of higher order. The bundle P is initialized for $f_m^1$, either with a random set of k POIs, or representative POIs of the city under investigation (function initialize( ) in line 1).

For several classes of utility measures, instead of relying on the brute-force enumeration strategy, in an embodiment, a more efficient heuristic is used to identify the optimal feasible pair of POIs to be swapped (changing P into P'). In particular, if the utility measure can be linearly decomposed into the individual utility of each of its constitutive POI (this is the case of the "popularity", "prestige", "recency", "freeness" and "crowd" utility measure), optimizing $f_m^i(P')$ amounts to selecting p∈P with the minimum individual utility and p'∈Pr\P with the maximum individual utility. For non-decomposable utility measures, when n is very large, optionally an approximate sampling strategy (e.g., Monte-Carlo with rejection, if the constraints are not satisfied) can be used instead of an exhaustive enumeration.

While online services such as "AroundMe" enable users to explore their nearby region by selecting explicit POI categories (e.g., museums, historical landmarks), mindsets capture implicit intents of users (e.g., "Let's learn") which are more challenging to capture.

Mindsets can be independent entities or may be combined with each other. For example, an intent of a user may be captured with a combination of two or more mindsets. Mindsets may be combined directly by selecting multiple mindsets by a user. Alternatively or additionally, mindsets may be combined in an indirect manner by selecting different mindsets in different iterations, wherein each result of one iteration affects the result of the subsequent result of the subsequent iteration. By selecting different mindsets during multiple iterations of the method for object recommendation, results of subsequent iterations may be influenced by previous selections of results by a user.

Figure 4:
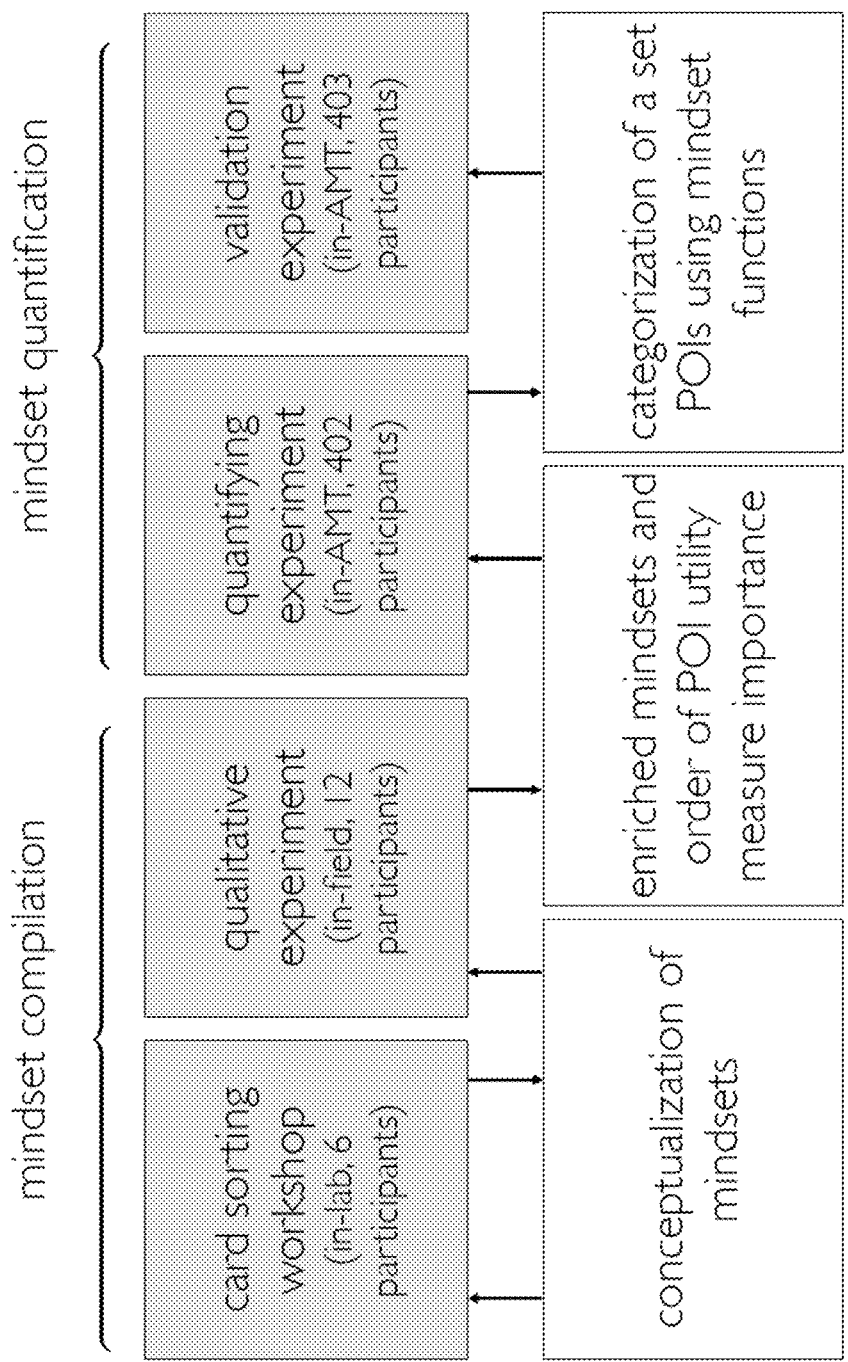
FIG. 4 illustrates a process flow diagram of a method for determining mindsets in accordance with disclosed embodiments.

FIG. 4 illustrates a process flow diagram of an example of a method for determining mindsets. To determine or obtain mindsets, which are also called "Ambient Mindsets", two consecutive steps may be performed: mindset compilation, and mindset quantification. In the compilation phase, the concept of mindsets may be introduced to a first group of participants and a set of initial mindsets is built. Then, the feedback from the participants is used to refine the mindsets for the needs of users, such as POI needs of new locals. In the quantification phase, a computational model for mindsets is used to enable an automatic selection of relevant subsets of POIs. In particular, a lexicographic multi-objective optimization (MOO) of utility measures is used to quantify respective mindsets.

Mindset compilation. Innovating a new set of category-based interfaces poses the limitation of uninformative labels for end-users who are accustomed to traditional categories. An ideal set of categories should not comprise too many in number yet cover all possible situations for exploring the recommendation results. They should also be consistent across individuals, i.e., the category labels should relay the same meaning for every user. The labels and the description of the mindsets may be based on data, such as user preferences, of a plurality of users. For example, the data of the plurality of users may be obtained by an in-lab card-sorting workshop. Additionally, an initial set of mindsets may be tested in the field with potential users, by embedding the mindsets into the prototype of a POI recommender system. Thus, the mindsets and the conceptual design of the mindsets can be validated and/or modified with user feedback.

Mindset quantification. Once mindsets have been conceptually defined, a next step may be to find a quantified formalization of their semantics in order to automate categorizing POIs into different mindsets. Mindset semantics may be formalized as a set of utility measures, e.g., "popularity", "surprisingness", and "diversity". Utility measures evaluate the interestingness of POIs, where a more interesting POI has higher chances to be recommended. Using the insights from a qualitative user study, a list of utility measures in the decreasing order of importance can be identified for each mindset. Then, an approximated lexicographic multi-objective optimization method can be applied to select relevant POIs for mindsets. Finally, the methodology for the compilation and quantification of POIs into mindsets can be validated with a quantitative experiment in a user study, e.g., on Amazon Mechanical Turk (AMT).

The method of compiling mindsets may comprise an internal card-sorting workshop and a qualitative experiment in the field with potential users. The qualitative experiment can be conducted with new locals, i.e., people who have recently moved to a new city, as participants. Based on the insights from the participants, mindsets can be defined for new locals. Then, mindsets can be quantified. In an embodiment, a relevant set of POIs is selected for a mindset, using lexicographic multi-objective optimization of POI utility measures. Finally, the methodology for compiling and quantifying mindsets can be validated with an extensive quantitative experiment.

While some specific embodiments have been described in detail above, it will be apparent to those skilled in the art that various modifications, variations, and improvements of the embodiments may be made in light of the above teachings and within the content of the appended claims without departing from the intended scope of the embodiments. In addition, those areas in which it is believed that those of ordinary skill in the art are familiar have not been described herein in order to not unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises processing circuitry including, for example, a processor communicating with a memory for performing one of the methods described herein. A further embodiment may comprise a computer having installed thereon the computer program or instructions for performing one of the methods described herein.

The above-mentioned methods and embodiments may be alternatively implemented within an architecture such as illustrated in FIG. 5, which comprises server 400 and one or more client devices 402 that communicate over a network 404 (which may be wireless and/or wired) such as the Internet for data exchange. Server 400 and the client devices 402 include a data processor 412 and memory 413 such as a hard disk. The client devices 402 may be any device that communicates with server 400, including autonomous vehicle 402b, robot 402c, computer 402d, or cell phone 402e.

More precisely in an embodiment, the method according to the embodiment of FIG. 2 may be performed at server 400. In other embodiments, the methods according to the embodiments of FIG. 2 may be performed at client device 402 partially or completely. In yet other embodiments, the methods may be performed at a different server or on a plurality of servers in a distributed manner.

A novel approach for object recommendation that is based on mindsets, which tackles the common challenges of cold start, contextuality, and explainability, is disclosed. Specifically, an efficient and robust method is disclosed for providing recommendations in a fast manner. Mindsets allow an extension of the user context of conventional systems, and allow to capture an actual situation, an emotion of a user, and intents of the user. Mindsets may be time-aware/time-dependent. The inventors have recognized that POI recommendations based on mindsets increase security, since users do not have to share personal data to get recommendations. The idea is that because no preferences or historical data is available from the user, the mindsets can function as catalysts, thus assisting users to describe their needs and generating a list of recommended POIs to explore. The concept of mindsets thus enables effective recommendations.

The current method may be referred to as an "Ambient Mindset" method. Ambient mindsets are a set of categories for mobile object recommendation, such as POI recommendation and exploration on the interface level for end-user interaction with the intelligent system. Unlike existing POI categories, such as Museums and Restaurants, which describe the characteristics of the POIs, mindsets such as "I'm hungry" and "Surprise me" describe the characteristics of the user instead. This approach notably accommodates users who do not have enough prior knowledge about their current location to describe the characteristics of the POIs available in that location. In an embodiment, 9 mindsets have been defined, tailored to the POI recommendation and exploration activities of the new locals, i.e., people who have recently relocated to a new city. This set of mindsets may be derived by involving new locals as participants in a qualitative experiment.

Ambient Mindsets is a novel dimension of contextuality, which aims to capture the actual situation, emotion, and intents of the user. The mindsets such as "I'm hungry" and "Surprise me" enable users to explicitly state their situational requirement. Each mindset is an explicit exploration direction that enables recommendations more oriented towards the user's needs. Hence, it is a bridge between POI recommendation and POI exploration. For instance, the mindset "Let's learn" limits the exploration options to POIs such as museums and libraries, biasing the recommendation results towards those genres of POIs. The incorporation of mindsets makes POI recommendation more aware of user needs, and POI exploration easier and faster to perform. The key factors in the conceptual design of mindsets are as follows.

Explicit signal. Mindsets may capture the mental state of the user, and hence are explicit signals of user needs for recommendation. Instead of hidden signals, such as time and location, this signal provides rich information on the user's intent, which enables recommendation and exploration systems to return results that are more relevant.

Obvious control. By selecting and changing the mindsets, users have a direct control over the recommended content. This helps users to avoid algorithmic anxiety, improve recommendation explainability, and build trust in the recommender system.

Low engagement. Mindsets help users to get faster access to their favorite POIs, by donating only a short span of time. This supports the nature of mobile information needs, where users are on-the-move and have low engagement thresholds.

Ambiguous exploration. Users might only have a vague idea of what they need, either because they are oblivious about the available content, or because they are not able to describe their needs for the system. In these exploratory settings, the user is not in any particular mindset to begin with, but he/she is open to explore the content. When the user only has an ambiguous intent or wants to browse without any initial intent, the mindsets support disambiguation of user needs and aid performing an exploration of the recommended content.

What is claimed is:

1. A computer-implemented method of locating points of interest for a user in a geographic area, comprising:
   receiving, with one or more processing circuits, an input from the user relating to at least one current state of the user;
   wherein (a) the at least one current state of the user corresponds with at least one of a plurality of current state functions, and (b) the plurality of current state functions respectively include a plurality of point of interest (POI) utility measures where (i) each POI utility measure comprising a relevance score corresponding with one or more state functions, and (ii) the plurality of POI utility measures are ordered in a selected sequence for each of the plurality of current state functions;
   calculating, with the one or more processing circuits, for pairs of the plurality of POI utility measures and the plurality of current state functions, an approximation ratio for each one of at least two POI utility measures with respect to each one of the plurality of current state functions, wherein each approximation ratio reflects a degree of dominance which is in an inverse relationship with the corresponding relevance score which reflects a user preference ; wherein each approximation ratio is calculated for each pair of the plurality of POI utility measures and the plurality of current state functions using a function that generates an output that decreases in value as the relevance score increases in value;
   using, with the one or more processing circuits, the at least one current state of the user as an index into a list including both the plurality of current state functions with the respective plurality of POI utility measures to select at least one of the plurality of current state functions for performing, using the computed approximation ratio, approximate lexicographic optimization with respect to the plurality of current state functions for both (a) rating, with the one or more processing circuits, a plurality of points of interest with respect to the selected at least one of the plurality of current state functions, and (b) based on said rating, automatically selecting, with the one or more processing circuits, a set of points of interest from the rated plurality points of interest; and
   providing, with the one or more processing circuits, the set of points of interest to the user.

2. The computer-implemented method of claim 1, wherein each approximation ratio reflects a degree of dominance of one of the utility measures with respect to at least one other utility measure in a common utility measure set.

3. The computer-implemented method of claim 2, wherein the selected sequence of each POI utility measure is ordered with a corresponding set of approximation ratios.

4. The computer-implemented method of claim 2, wherein the calculated approximation ratios are based on user preferences of a plurality of users different from the user.

5. The computer-implemented method of claim 2, wherein a learning model learns preferences of the user based on inputs of the user and wherein at least one of the plurality of current state functions or at least one of the approximation ratios is modified in accordance with the preferences of the user.

6. The computer-implemented method of claim 1, wherein:
   said rating a plurality of points of interests includes (i) rating different sets of points of interest, and (ii) calculating scores for the different sets of points of interest using at least two utility measures of the plurality of utility measures; and
   at least one utility measure of the at least two utility measures provides an optimal score for the selected set of points of interest.

7. The computer-implemented method of claim 6, wherein a utility measure of the at least two utility measures provides a score for the set of points of interest that is within a range, the range being defined by an optimal score for both the utility measure and an approximation ratio corresponding to the utility measure.

8. The computer-implemented method of claim 1, in which the plurality of POI utility measures comprises a first utility measure set and a second utility measure set with the first utility measure set including a first number of utility measures and the second utility measure set including a second number of utility measures, wherein the first number of utility measures is different than the second number of utility measures.

9. The computer-implemented method of claim 1, in which the plurality of POI utility measures comprise a first utility measure set and a second utility measure set, wherein the first utility measure set includes a utility measure that is not in the second utility measure set.

10. The computer-implemented method of claim 1, in which the plurality of POI utility measures comprises a first utility measure set and a second utility measure set with the first utility measure set including a first sequence of utility measures and the second utility measure set including a second sequence of utility measures, wherein the order of the first sequence of utility measures is different than the order of the second sequence of utility measures.

11. The computer-implemented method of claim 1, wherein:
   said selection of at least one of the plurality of current state functions includes selecting a first current state function and a second current state function; and said rating includes rating the plurality of points of interest with respect to both the first and second current state functions.

12. The computer-implemented method of claim 1, wherein the order of each selected sequence is based on user preferences of a plurality of users different from the user.

13. The computer-implemented method of claim 2, wherein each approximation ratio is calculated with the following relationship:

$$\zeta_m^i = \frac{4 - (w_m^i - 1)}{4}$$

where $\zeta_m^i$ is the i-th approximation ratio with respect to a current state function (m); and $w_m^i$ is the i-th average of participants' relevance scores with respect to m.

14. A system for locating points of interest for a user in a geographic area, comprising:
one more processors;
memory including code that, when executed by the one or more processors performs the following functions including:
receiving an input from the user, the input from the user relating to at least one current state of the user; wherein (a) the at least one current state of the user corresponds with at least one of a plurality of current state functions, and (b) the plurality of current state functions respectively include a plurality of point of interest (POI) utility measures where (i) each POI utility measure comprising a relevance score corresponding with one or more state functions, and (ii) the plurality of POI utility measures are ordered in a selected sequence for each of the plurality of current state functions;
calculating, for pairs of the plurality of POI utility measures and the plurality of current state functions, an approximation ratio for each one of at least two POI utility measures with respect to each one of the plurality of current state functions, wherein each approximation ratio reflects a degree of dominance which is in an inverse relationship with the corresponding relevance score which reflects a user preference; wherein each approximation ratio is calculated for each pair of the plurality of POI utility measures and the plurality of current state functions using a function that generates an output that decreases in value as the relevance score increases in value;
using the at least one current state of the user as an index into a list including both the plurality of current state functions with the respective plurality of POI utility measures to select at least one of the plurality of current state functions to perform, using the computed approximation ratio, approximate lexicographic optimization with respect to the plurality of current state functions to both (a) rate a plurality of points of interest with respect to the selected at least one of the plurality of current state functions, and (b) based on said rating, automatically select a set of points of interest from the rated plurality points of interest; and
providing the set of points of interest to the user.

15. The system of claim 14, wherein each approximation ratio reflects a degree of dominance of one of the utility measures with respect to at least one other utility measure in a common utility measure set.

16. The system of claim 15, wherein the selected sequence of each POI utility measure is ordered with a corresponding set of approximation ratios.

17. The system of claim 15, wherein the calculated approximation ratios are based on user preferences of a plurality of users different from the user.

18. The system of claim 15, wherein said memory further including code for a learning model that, when executed by the one or more processors, performs the following functions including learning preferences of the user based on inputs of the user and wherein at least one of the plurality of current state functions or at least one of the approximation ratios is modified in accordance with the preferences of the user.

19. The system of claim 14, wherein:
said rating a plurality of points of interests includes (i) rating different sets of points of interest, and (ii) calculating scores for the different sets of points of interest using at least two utility measures of the plurality of utility measures; and
at least one utility measure of the at least two utility measures provides an optimal score for the selected set of points of interest.

20. The system of claim 19, wherein a utility measure of the at least two utility measures provides a score for the set of points of interest that is within a range, the range being defined by an optimal score for both the utility measure and an approximation ratio corresponding to the utility measure.

21. The system of claim 14, in which the plurality of POI utility measures comprises a first utility measure set and a second utility measure set with the first utility measure set including a first number of utility measures and the second utility measure set including a second number of utility measures, wherein the first number of utility measures is different than the second number of utility measures.

22. The system of claim 14, in which the plurality of POI utility measures comprise a first utility measure set and a second utility measure set, wherein the first utility measure set includes a utility measure that is not in the second utility measure set.

23. The system of claim 14, in which the plurality of POI utility measures comprises a first utility measure set and a second utility measure set with the first utility measure set including a first sequence of utility measures and the second utility measure set including a second sequence of utility measures, wherein the order of the first sequence of utility measures is different than the order of the second sequence of utility measures.

24. The system of claim 14, wherein:
said selection of at least one of the plurality of current state functions includes selecting a first current state function and a second current state function; and
said rating includes rating the plurality of points of interest with respect to both the first and second current state functions.

25. The system of claim 14, wherein the order of each selected sequence is based on user preferences of a plurality of users different from the user.

26. The system of claim 15, wherein each approximation ratio is calculated with the following relationship:

$$\zeta_m^i = \frac{4 - (w_m^i - 1)}{4}$$

where $\zeta_m^i$ is the i-th approximation ratio with respect to a current state function (m); and $w_m^i$ is the i-th average of participants' relevance scores with respect to m.

\* \* \* \* \*